United States Patent
Nagano

(10) Patent No.: US 11,333,867 B2
(45) Date of Patent: May 17, 2022

(54) IMAGING LENS AND IMAGING DEVICE

(71) Applicant: Takuya Nagano, Kanagawa (JP)

(72) Inventor: Takuya Nagano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 378 days.

(21) Appl. No.: 16/579,888

(22) Filed: Sep. 24, 2019

(65) Prior Publication Data
US 2020/0142166 A1 May 7, 2020

(30) Foreign Application Priority Data

Nov. 1, 2018 (JP) .............................. JP2018-206711

(51) Int. Cl.
*G02B 15/14* (2006.01)
*H04N 5/225* (2006.01)
*H04N 5/372* (2011.01)
*H04N 5/374* (2011.01)

(52) U.S. Cl.
CPC ......... *G02B 15/143* (2019.08); *H04N 5/2254* (2013.01); *H04N 5/372* (2013.01); *H04N 5/374* (2013.01)

(58) Field of Classification Search
CPC .. C07K 1/34; G01N 2800/52; G01N 2800/56; G01N 2800/60; G01N 33/57438; G01N 33/6842; G01N 33/6848; G02B 13/04; G02B 15/143; G02B 9/64; H04N 5/2254; H04N 5/372; H04N 5/374
See application file for complete search history.

(56) References Cited

U.S. PATENT DOCUMENTS

| 4,029,397 A | 6/1977 | Yamashita |
| 4,061,421 A | 12/1977 | Nakagawa |
| 4,776,680 A * | 10/1988 | Tanaka ................. G02B 15/173 359/740 |

(Continued)

FOREIGN PATENT DOCUMENTS

| CN | 102236156 A | 11/2011 |
| CN | 102736231 A | 10/2012 |

(Continued)

OTHER PUBLICATIONS

Extended European Search Report dated Mar. 23, 2020, issued in corresponding European Patent Application No. 19197383.3, 11 pages.

(Continued)

*Primary Examiner* — Amy R Hsu
(74) *Attorney, Agent, or Firm* — Xsensus LLP

(57) ABSTRACT

An imaging lens includes a first lens group, a second lens group having positive refractive power, an aperture, and a third lens group having positive refractive power, sequentially disposed in that order from an object side to an image side. During a focusing from infinity to a short length, a combination of the second lens group, the aperture, and the third lens group as a single unit moves to the object side so as to reduce a distance to the first lens group. The second lens group includes four lenses of a second-first negative lens, a second-second positive lens, a second-third negative lens, and a second-fourth positive lens sequentially disposed in that order from the object side to the image side.

16 Claims, 14 Drawing Sheets

(56) References Cited

U.S. PATENT DOCUMENTS

| | | | | |
|---|---|---|---|---|
| 5,325,236 A * | 6/1994 | Tanaka | ............... | G02B 15/177 |
| | | | | 359/689 |
| 5,631,780 A * | 5/1997 | Sato | ............... | G02B 13/04 |
| | | | | 359/708 |
| 5,805,359 A * | 9/1998 | Yamanashi | ............... | G02B 9/58 |
| | | | | 359/686 |
| 6,710,942 B2 * | 3/2004 | Sato | ............... | G02B 13/04 |
| | | | | 359/708 |
| 8,000,035 B2 * | 8/2011 | Harada | ............... | G02B 13/06 |
| | | | | 359/749 |
| 2003/0103275 A1 | 6/2003 | Sato | | |
| 2006/0250514 A1 * | 11/2006 | Inoue | ............... | H04N 5/2254 |
| | | | | 348/E5.026 |
| 2018/0056869 A1 | 3/2018 | Nagano | | |
| 2018/0267277 A1 | 9/2018 | Nagano | | |

FOREIGN PATENT DOCUMENTS

| | | |
|---|---|---|
| JP | 2009-198854 A | 9/2009 |
| JP | 2013-217952 | 10/2013 |
| JP | 2017-102173 | 6/2017 |

OTHER PUBLICATIONS

Herbert Grass et al., Handbook of Optical Systems, vol. 3: Aberration Theory and Correction of Optical Systems, 5 pages, Jan. 1, 2007.

Office Action dated Jun. 3, 2021 in Chinese Patent Application No. 201911050924.1, 8 pages.

Office Action dated Jan. 24, 2022 in Chinese Patent Application No. 201911050924.1, 7 pages.

* cited by examiner

IMAGING LENS AND IMAGING DEVICE

CROSS-REFERENCE TO RELATED APPLICATIONS

This patent application is based on and claims priority pursuant to 35 U.S.C. § 119(a) to Japanese Patent Application No. 2018-206711, filed on Nov. 1, 2018, in the Japan Patent Office, the entire disclosure of which is incorporated by reference herein.

BACKGROUND

Technical Field

Embodiments of this disclosure relate to an imaging lens and an imaging device.

Description of the Related Art

Conventionally, as imaging devices using an area sensor, photographing cameras for photographing an object such as a compact camera, a single-lens reflex camera, and a mirrorless camera are widely known. Recently, a range of application of such imaging devices is expanded to an industrial camera, an on-vehicle camera, a surveillance camera, and the like.

SUMMARY

An imaging lens includes a first lens group, a second lens group having positive refractive power, an aperture, and a third lens group having positive refractive power that are sequentially arranged from an object side to an image side. During a focusing from infinity to a short length, a combination of the second lens group, the aperture, and the third lens group as a single unit moves to the object side so as to reduce a distance to the first lens group. The second lens group includes four lenses of a second-first negative lens, a second-second positive lens, a second-third negative lens, and a second-fourth positive lens are sequentially arranged from the object side to the image side.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
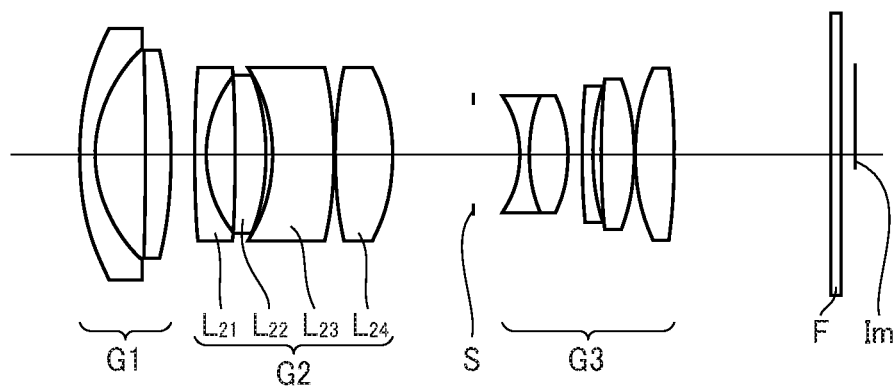
FIG. 1 is a cross-sectional view of a configuration of an imaging lens according to a first embodiment.
Figure 1:
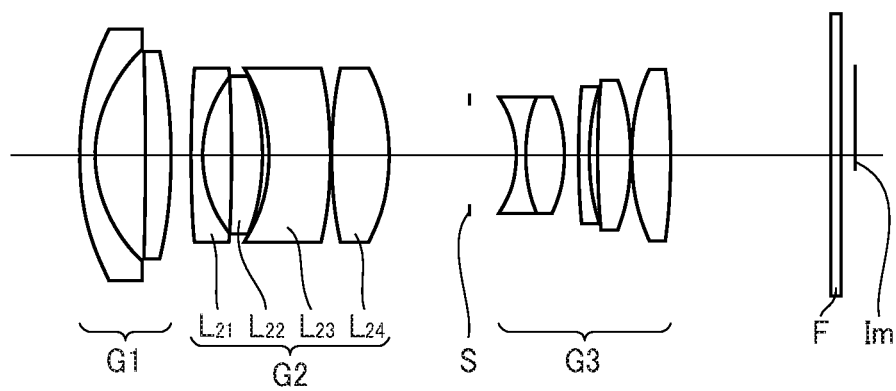
Figure 1:
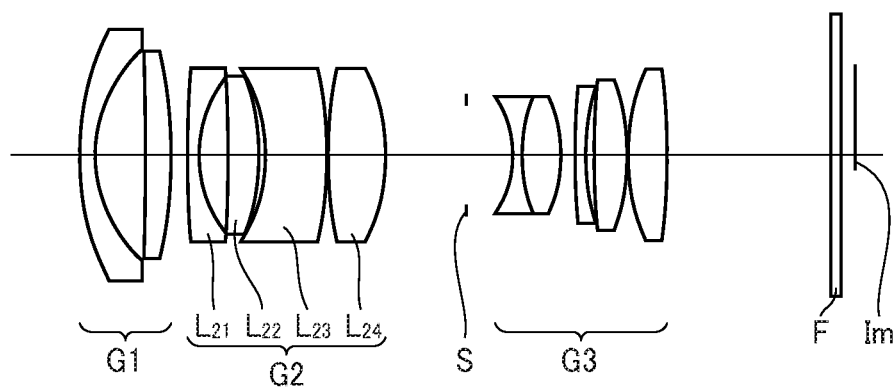
Figure 2:
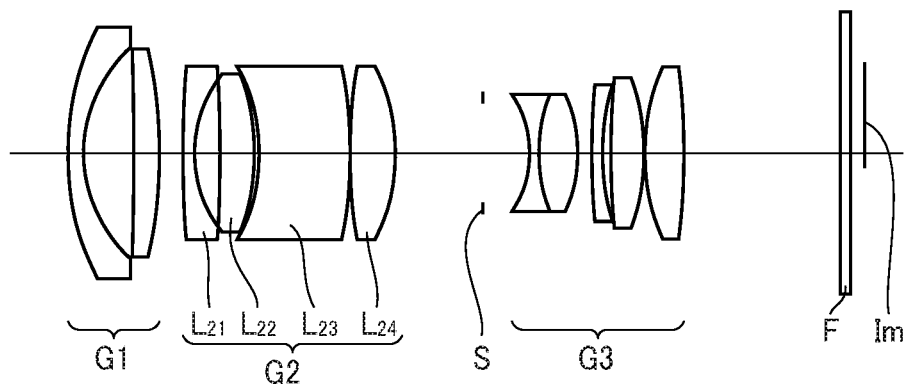
FIG. 2 is a cross-sectional view of a configuration of an imaging lens according to a second embodiment.
Figure 2:
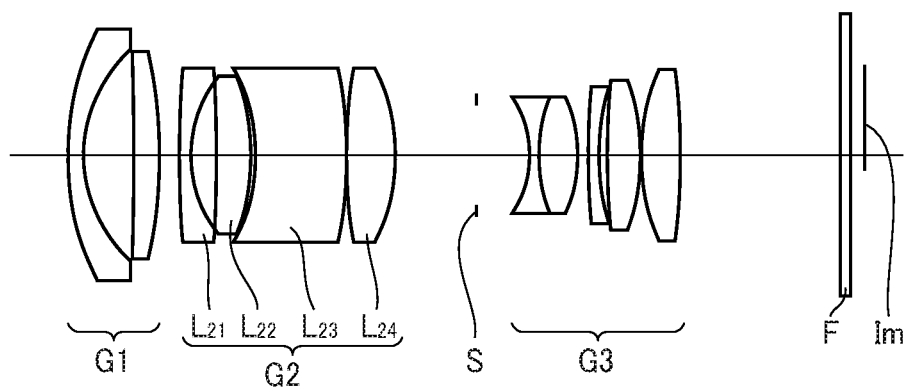
Figure 2:
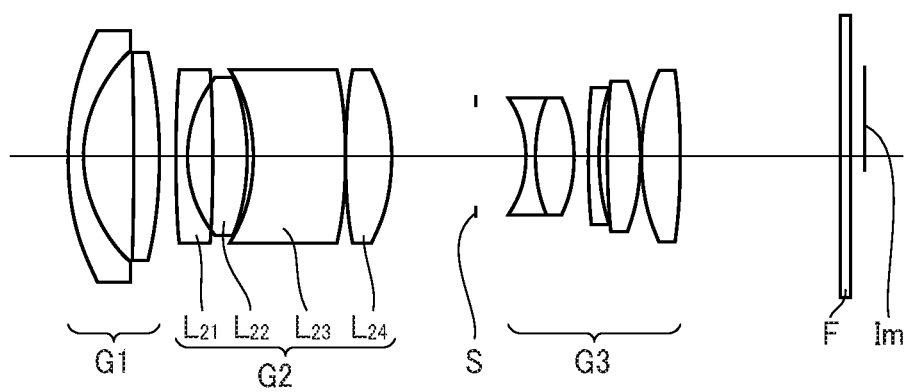
Figure 3:
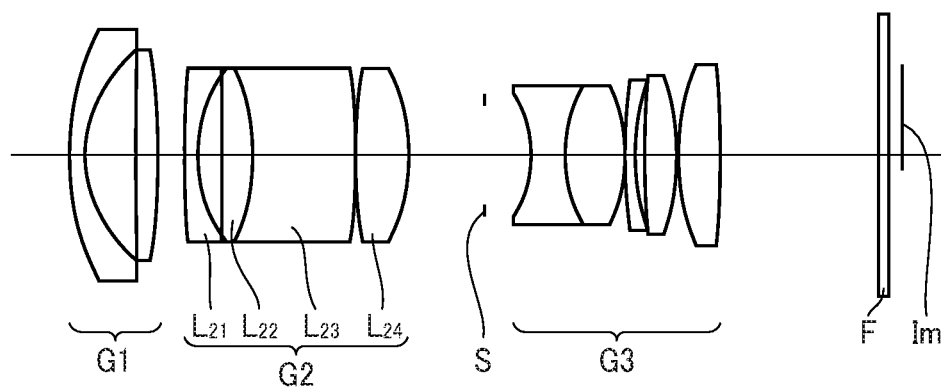
FIG. 3 is a cross-sectional view of a configuration of an imaging lens according to a third embodiment.
Figure 3:
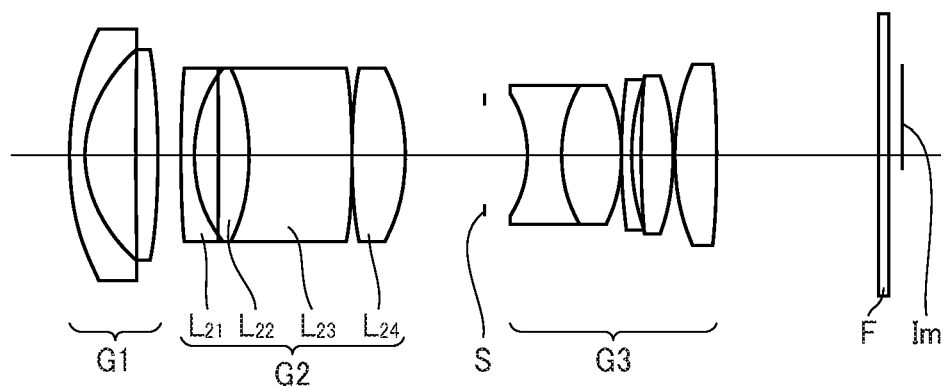
Figure 3:
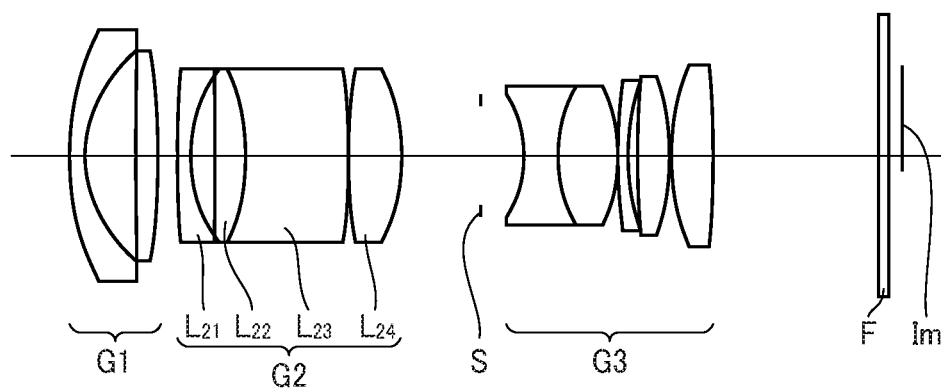
Figure 4:
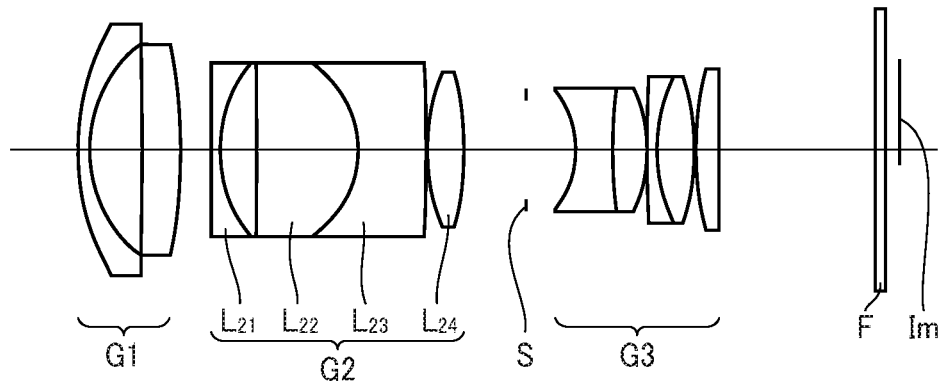
FIG. 4 is a cross-sectional view of a configuration of an imaging lens according to a fourth embodiment.
Figure 4:
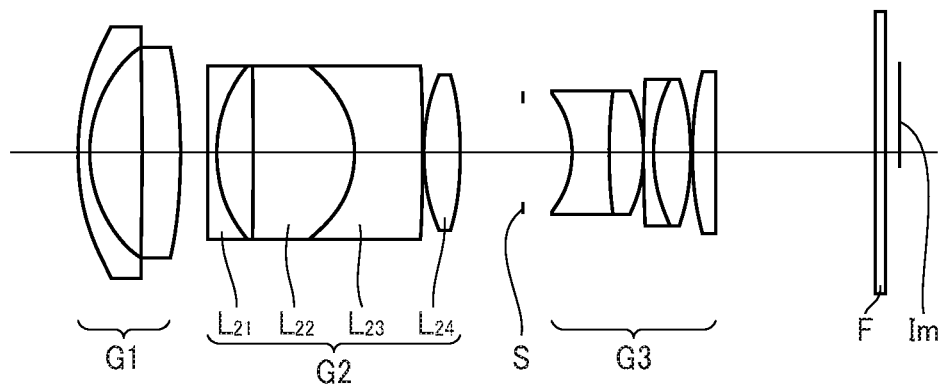
Figure 4:
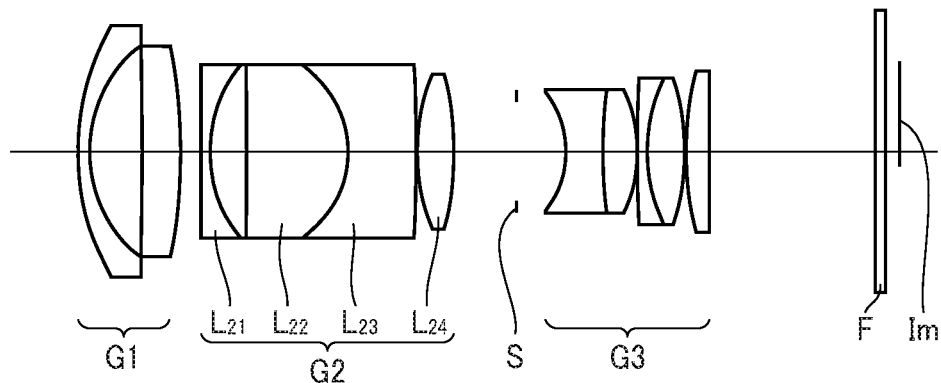
Figure 5:
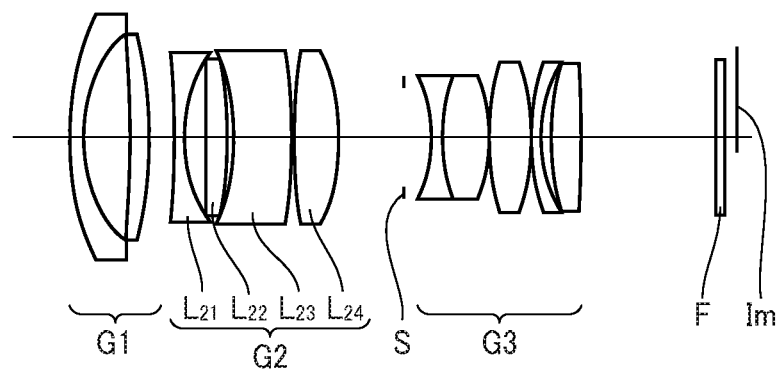
FIG. 5 is a cross-sectional view of a configuration of an imaging lens according to a fifth embodiment.
Figure 5:
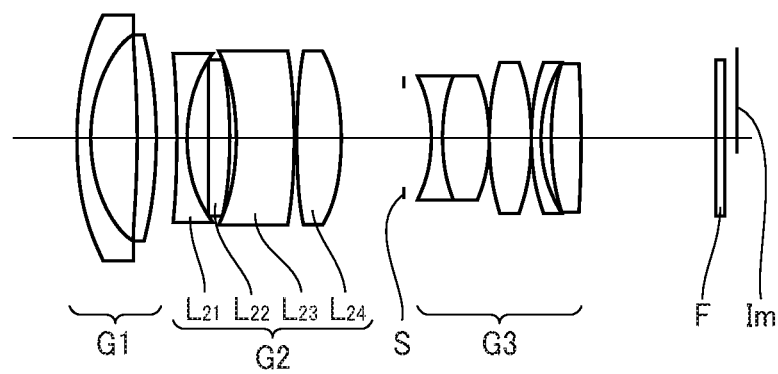
Figure 5:
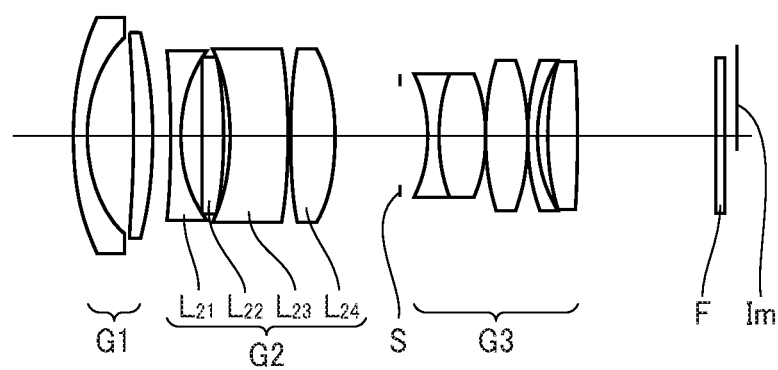

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components)

having the same function or shape and redundant descriptions thereof are omitted below.

A description will hereinafter be made on embodiments of this disclosure.

FIG. 1 to FIG. 5 illustrate five embodiments of an imaging lens, and these embodiments respectively correspond to first to fifth embodiments, which will be described later, in an order of illustration.

The imaging lenses, the embodiment of which are illustrated in these drawings, are each assumed to be an imaging lens used for "machine vision in a product inspection apparatus or the like" as an example of an industrial camera.

In each of FIG. 1 to FIG. 5, a left side of the drawing is an "object side", and a right side thereof is an "image side".

The drawing in an upper portion illustrates lens arrangement at the time when the imaging lens is "focused at infinity", the drawing in an intermediate portion illustrates the lens arrangement at the time when the imaging lens is "focused on a middle length", and the drawing in a lower portion illustrates the lens arrangement at the time when the imaging lens is "focused on a short length". In the embodiments, which will be described later, the "middle length" corresponds to a length that is set when the imaging lens is focused on the object with a magnification of −0.03.

In order to avoid complexity, the reference numerals and symbols will be made common in FIG. 1 to FIG. 5.

That is, in these drawings, a first lens group G1, a second lens group G2, and a third lens group G3, and an aperture S are illustrated.

An image plane Im is disposed on the image side of the third lens group G3. In an imaging device using the imaging lenses, which will be described below, an object image formed by the imaging lenses is assumed to be captured by an area sensor such as a charge-coupled device (CCD) area sensor, a metal-oxide semiconductor (MOS) sensor, or a complementary metal-oxide semiconductor (CMOS) sensor, and the object image is formed on a sensor light receiving plane that matches the image plane Im. A transparent plate F equivalent to any of a cover glass and various filters in the area sensor is disposed on the object side of the image plane.

The first lens group G1 has positive or negative refractive power, and both of the second lens group G2 and the third lens group G3 have the "positive refractive power".

As illustrated in each of FIG. 1 to FIG. 5, at the time of focusing from infinity (the drawing in the upper portion) to the short length (the drawing in the lower portion), a combination of the second lens group G2, the aperture S, and the third lens group G3 as a single unit moves to the object side so as to reduce a distance to the first lens group G1.

In these embodiments, the first lens group G1 includes two lenses, and the third lens group G3 includes five lenses. However, the number of the lenses provided in each of the first lens group G1 and the third lens group G3 is not limited thereto.

The second lens group G2 includes four lenses. These four lenses will sequentially be referred to as a negative lens $L_{21}$, a positive lens $L_{22}$, a negative lens $L_{23}$, and a positive lens $L_{24}$ from the object side, and will respectively denoted by the reference numerals and symbols $L_{21}$, $L_{22}$, $L_{23}$, and $L_{24}$ in the drawings.

In the second lens group G2, spherical aberration, coma aberration, or the like generated on an image-side lens plane of the negative lens $L_{21}$ is canceled out by the positive lens $L_{24}$ for aberration correction. However, such aberration correction is insufficient, and thus, deterioration of performance associated with focusing is not sufficiently prevented. In view of this, the positive lens $L_{22}$ and the negative lens $L_{23}$ are arranged between the negative lens $L_{21}$ and the positive lens $L_{24}$, so as to be able to favorably correct monochromatic aberration and chromatic aberration, which are not able to be sufficiently corrected only by the two lenses $L_{21}$ and $L_{24}$.

Just as described, the second lens group G2 includes four lenses of the negative lens (second-first negative lens) $L_{21}$, the positive lens (second-second positive lens) $L_{22}$, the negative lens (second-third negative lens) $L_{23}$, and the positive lens (second-fourth positive lens) $L_{24}$, which are sequentially arranged in that order from the object side to the image side. A length on an optical axis from an object-side lens plane of the positive lens $L_{22}$ to an image-side lens plane of the negative lens $L_{23}$: $d_{L22a-L23b}$ and a length on the optical axis from an object-side lens plane of the negative lens $L_{21}$ to an image-side lens plane of the positive lens $L_{24}$: $L_{2g}$ preferably satisfy a conditional expression:

$$0.40 < d_{L22a-L23b}/L_{2g} < 0.75. \quad (1)$$

In addition to the conditional expression (1), the following conditional expression (1a) is preferably satisfied:

$$0.00 \leq d_{L22b-L23a}/d_{L22a-L23b} < 0.10. \quad (1a)$$

"$d_{L22b-L23a}$" in a parameter of the conditional expression (1a) represents a length along the optical axis from an image-side lens plane of the positive lens $L_{22}$ to an object-side lens plane of the negative lens $L_{23}$, and "$d_{L22a-L23b}$" represents, as described above, the length on the optical axis from the object-side lens plane of the positive lens $L_{22}$ to the image-side lens plane of the negative lens $L_{23}$.

In addition to at least one of the conditional expression (1) and the conditional expression (1a), the imaging lenses further preferably satisfy at least one of the following conditional expressions (2) to (9).

$$1.15 < f_{2g3g}/f < 1.45 \quad (2)$$

$$-0.85 < f_{L21}/f_{L24} < -0.45 \quad (3)$$

$$-0.50 < (R_{L21b}+R_{L24b})/(R_{L21b}-R_{L24b}) < -0.05 \quad (4)$$

$$-0.85 < f_{L22}/f_{L23} < -0.25 \quad (5)$$

$$0.20 < f_{2g}/f_{L22L23} < 0.65 \quad (6)$$

$$0.40 < L_{3g}/L_{2g} < 1.00 \quad (7)$$

$$0.60 < f_{2g}/f_{3g} < 1.50 \quad (8)$$

$$-0.35 < (R_{L31a}-R_{L32b})/(R_{L31a}+R_{L32b}) < -0.03 \quad (9)$$

Symbols in parameters of the conditional expressions (2) to (8) have the following meanings.

f: Focal length of the whole system in a state where the imaging lenses are focused at infinity $f_{2g3g}$: Composite focal length of the second lens group G2 and the third lens group G3

$f_{L21}$: Focal length of the negative lens $L_{21}$ $f_{L24}$: Focal length of the positive lens $L_{24}$ $R_{L21b}$: Radius of curvature of the image-side lens plane of the negative lens $L_{21}$ $R_{L24b}$: Radius of curvature of the image-side lens plane of the positive lens $L_{24}$ $f_{L22}$: Focal length of the positive lens $L_{22}$ $f_{L23}$: Focal length of the negative lens $L_{23}$ $f_{2g}$: Focal length of the second lens group G2

$f_{L22L23}$: Composite focal length of the positive lens $L_{22}$ and the negative lens $L_{23}$ $L_{3g}$: Length on the optical axis from a lens plane closest to the object side in the third lens group G3 to a lens plane closest to the image side therein $L_{2g}$: Length on the optical axis from the object-side lens plane of the negative lens $L_{21}$ to the image-side lens plane of the positive lens $L_{24}$ $f_{3g}$: Focal length of the third lens group G3

The conditional expression (9) is a condition in the case where the third lens group G3 has a cemented lens of a negative lens (third-first negative lens) $L_{31}$ and a positive lens (third-second positive lens) $L_{32}$ disposed closest to the object side, and symbols in the parameter have the following meanings.

$R_{L31a}$: A radius of curvature of an object-side lens plane of the negative lens $L_{31}$ in the cemented lens $R_{L32b}$: Radius of curvature of an image-side lens plane of the positive lens $L_{32}$ in the cemented lens In the case where the third lens group G3 has the cemented lens of the negative lens $L_{31}$ and the positive lens $L_{32}$ on the closest side to the object side and the conditional expression (9) is satisfied, the positive lens $L_{32}$ in the cemented lens of the third lens group G3 is preferably formed of a material that satisfies the following conditional expressions:

$$1.45 < nd < 1.65 \tag{10}$$

$$60.0 < vd < 95.0 \tag{11}$$

$$0.009 < \theta_{g,F} - (-0.001802 \times vd + 0.6483) < 0.060. \tag{12}$$

"$\theta_{g,F}$" in the conditional expression (11) is a known partial dispersion ratio, and is defined by a refractive index of a d line of the lens material: nd, the Abbe number of the d line: vd, and refractive indices with respect to a g line, an F line, and a C line: ng, nF, nC:

$$\theta_{g,F} = (ng - nF)/(nF - nC).$$

As described above, in regard to the imaging lens according to this disclosure, the second lens group G2 includes the four lenses $L_{21}$ to $L_{24}$. However, when the second lens group G2 is configured to satisfy the above conditional expression (1), the further favorable aberration correction can be made.

The conditional expression (1) defines a ratio of the length along the optical axis from the object-side lens plane of the positive lens $L_{22}$ to the image-side lens plane of the negative lens $L_{23}$: $L_{2g}$ to the total length: $d_{L22a-L23b}$ in the second lens group G2.

As described above, since the positive lens $L_{22}$ and the negative lens $L_{23}$ are arranged between the negative lens $L_{21}$ and the positive lens $L_{24}$, residual aberration that is not able to be corrected by the negative lens $L_{21}$ and the positive lens $L_{24}$ can be shared by the positive lens $L_{22}$ and the negative lens $L_{23}$ for the aberration correction. In this way, favorable imaging performance can be achieved.

However, in the case where the length on the optical axis from the object-side lens plane of the positive lens $L_{22}$ to the image-side lens plane of the negative lens $L_{23}$: $d_{L22a-L23b}$ becomes short enough to fall below a lower limit value of the conditional expression (1) with respect to the length: $L_{2g}$, the "aberration correction made by the positive lens $L_{22}$ and the negative lens $L_{23}$" becomes insufficient. As a result, it becomes difficult to realize the favorable imaging performance.

Meanwhile, in the case where the length $d_{L22a-L23b}$ becomes long enough to exceed an upper limit value of the conditional expression (1) with respect to the length $L_{2g}$, limitations are imposed on thicknesses and shapes of the negative lens $L_{21}$ and the positive lens $L_{24}$. As a result, the aberration is not able to be corrected properly by the negative lens $L_{21}$ and the positive lens $L_{24}$.

When the conditional expression (1) is satisfied, the correction such as the spherical aberration, the coma aberration, field curvature, and the chromatic aberration can be made favorably, and the deterioration of the performance associated with the focusing can be prevented.

When the second lens group G2 is configured to satisfy the conditional expression (1a), the aberration correction can further effectively be made by the positive lens $L_{22}$ and the negative lens $L_{23}$. As a result, the further favorable aberration correction can be made by the entire second lens group G2.

The conditional expression (2) defines a ratio of a composite focal length of the second lens group G2 and the third lens group G3 to the focal length of the whole system: f (the focal length in the state where the imaging lenses are focused at infinity).

In the case where the above ratio exceeds an upper limit value of the conditional expression (2), combined power of the second lens group G2 and the third lens group G3 becomes excessively small with respect to power of the whole system, the second and third lens groups have a weakened "function as a focus group", displacement of the focus group tends to be increased, and, in addition to enlargement of each of the imaging lenses, all of the imaging lenses including a mechanism for moving the focus group tend to be enlarged.

In the case where the above ratio falls below a lower limit value of the conditional expression (2), the combined power of the second lens group G2 and the third lens group G3 becomes excessively large with respect to the power of the whole system, the aberration between the second lens group G2 and the third lens group G3 tends to occur, the aberration correction during the focusing becomes difficult, and a variation in lens performance associated with the focusing tends to be increased.

When the conditional expression (2) is satisfied, it is possible to focus with the small displacement while the favorable aberration correction is made.

The conditional expression (3) defines a ratio of the focal length of the negative lens $L_{21}$ to the focal length of the positive lens $L_{24}$ in the second lens group G2.

When the conditional expression (3) is satisfied, power balance between the negative lens $L_{21}$ and the positive lens $L_{24}$, which correct the relatively large aberration, can be well-maintained. As a result, the favorable aberration correction can be made.

In the case where the above ratio exceeds an upper limit value of the conditional expression (3), negative power of the negative lens L21 becomes excessively large. On the contrary, in the case where the above ratio falls below a lower limit value thereof, the negative power of the negative lens L21 becomes excessively small. As a result, it is difficult to make the favorable aberration correction.

The conditional expression (4) defines a shape formed by the image-side lens plane of the negative lens $L_{21}$ and the image-side lens plane of the positive lens $L_{24}$ in the second lens group. On these lens planes, the spherical aberration and the coma aberration are mainly corrected, and the conditional expression (4) is a condition under which it is possible to favorably reduce or eliminate the spherical aberration and the coma aberration over an entire photographing length".

In the case where the value exceeds an upper limit value of the conditional expression (4), a difference in the radius of curvature between the image-side lens plane of the negative lens $L_{21}$ and the image-side lens plane of the positive lens $L_{24}$ becomes excessively small, and the spherical aberration tends to be generated in a lower portion.

In the case where the value exceeds a lower limit value of the conditional expression (4), the difference in radius of curvature between the image-side lens plane of the negative lens $L_{21}$ and the image-side lens plane of the positive lens $L_{24}$ becomes excessively large, and the spherical aberration tends to be generated in an upper portion.

The conditional expression (5) defines a ratio of the focal length of the positive lens $L_{22}$ to the focal length of the negative lens $L_{23}$ in the second lens group G2.

In the case where the above ratio exceeds an upper limit value of the conditional expression (5), positive power of the positive lens $L_{22}$ becomes excessively large. On the contrary, in the case where the above ratio falls below a lower limit value thereof, the positive power of the positive lens $L_{22}$ becomes excessively small.

The positive lens $L_{22}$ and the negative lens $L_{23}$ are used for the further favorable "aberration correction made by the negative lens $L_{21}$ and the positive lens $L_{24}$".

In the case where the above ratio falls out of a range of the conditional expression (5), "positive/negative power balance between the positive lens $L_{22}$ and the negative lens $L_{23}$" is lost. As a result, the excessive aberration correction tends to be made, and it becomes difficult to make the favorable aberration correction.

When the above ratio falls within the range of the conditional expression (5), the positive lens $L_{22}$ and the negative lens $L_{23}$ can effectively play such a role that the "residual aberration that is not able to be corrected by the negative lens $L_{21}$ and the positive lens $L_{24}$ are shared by the positive lens $L_{22}$ and the negative lens $L_{23}$ for the aberration correction". As a result, it is possible to favorably prevent the deterioration of the performance associated with the focusing.

The conditional expression (6) defines a ratio of the focal length of the second lens group G2 with respect to the composite focal length of the positive lens $L_{22}$ and the negative lens $L_{23}$ in the second lens group G2.

The second lens group G2 has the positive power as a whole. However, in the case where the above ratio exceeds an upper limit value of the conditional expression (6), the combined positive power of the positive lens $L_{22}$ and the negative lens $L_{23}$ becomes excessively large. As a result, the excessive aberration tends to be generated in the second lens group G2, and the favorable aberration correction tends to be difficult.

In the case where the above ratio falls below a lower limit value of the conditional expression (6), the combined positive power of the positive lens $L_{22}$ and the negative lens $L_{23}$ becomes excessively small. As a result, "contribution to the aberration correction" in the second lens group G2 tends to become excessively small, and the favorable aberration correction tends to be difficult.

The conditional expression (7) defines a ratio of a total length of the third lens group G3 to the total length of the second lens group G2.

When the value is set to fall within a range of the conditional expression (7), it is possible to realize appropriate size balance "before and after the aperture S" between the second and third lens groups G2 and G3 as the focus group. In addition, it is possible to simultaneously downsize the imaging lenses and make the favorable aberration correction.

The conditional expression (8) defines a ratio of the focal length of the second lens group G2 to the focal length of the third lens group G3.

On the outside of a range of the conditional expression (8), the power balance between the second lens group G2 and the third lens group G3 is easily lost, and the aberration correction tends to become difficult. When the conditional expression (8) is satisfied, it is easy to achieve the power balance of the focus group between the object side and the image side of the aperture, and it is easy to achieve the favorable aberration correction and to prevent the deterioration of the performance associated with the focusing.

As described above, the conditional expression (9) is the condition in the case where the third lens group G3 "has the cemented lens of the negative lens $L_{31}$ and the positive lens $L_{32}$ on the closest side to the object side", and defines a shape formed by the image-side lens plane of the negative lens $L_{31}$ and the image-side lens plane of the positive lens $L_{32}$.

On these lens planes, the spherical aberration, the coma aberration, astigmatism, and the like are mainly corrected. When the conditional expression (9) satisfied, the further favorable aberration correction can be made.

A material of the positive lens $L_{32}$ is selected in a manner to satisfy the conditional expressions (10), (11), and (12) in the case where the conditional expression (9) is satisfied. In this way, the favorable chromatic aberration correction can be made.

The chromatic aberration of magnification is more likely to be generated as the focal length of the imaging lens is increased.

The material that satisfies the conditional expressions (10), (11) and (12) is an optical material having high abnormal dispersibility and low dispersion. In the case where the positive lens $L_{32}$ is formed of such a material, it is possible to effectively prevent generation of the chromatic aberration even with the short focal length.

In the case of a large aperture lens, axial chromatic aberration also has to be corrected sufficiently. In particular, when a glass type with the abnormal dispersibility is used for the positive lens, through which an axial marginal ray passes at a relatively high position, a secondary spectrum of the chromatic aberration can effectively be corrected, and the generation of the axial chromatic aberration can sufficiently be prevented.

In the case where the refractive index falls below a lower limit value of the conditional expression (10), the monochromatic aberration tends to be insufficiently corrected. In the case where the refractive index exceeds an upper limit value, the chromatic aberration tends to be insufficiently corrected.

In the case where the partial dispersion ratio falls below a lower limit value of the conditional expression (12), the secondary spectrum of the chromatic aberration tends to be insufficiently corrected. The optical material having values that are equal to or larger than the upper limit values of the conditional expressions (10), (11) and (12) does not exist, or, even if exists, extremely special and expensive and thus is unrealistic.

The third lens group G3 of the imaging lenses is preferably configured to sequentially include a negative lens (third-third negative lens) $L_{33}$, a positive lens (third-fourth positive lens) $L_{34}$, and a positive lens (third-fifth positive lens) $L_{35}$ from the object side on the image side of the cemented lens of the negative lens $L_{31}$ and the positive lens $L_{32}$.

In the case where the third lens group G3 is configured just as described, the aberration correction is made by the negative lens and the positive lens on the image side of the cemented lens. However, when the positive lens is divided into two of the positive lens $L_{34}$ and the positive lens $L_{35}$ for the aberration correction. As a result, the further favorable aberration correction can be made. In addition, when the positive lens $L_{35}$ is used as a final lens, it is possible to reduce an incident angle on the image plane.

As described above, the first lens group G1 can have the positive or negative power. In the case where the first lens group G1 has the negative power, the imaging lenses become a so-called "retro focus type" having negative/positive/positive power distribution. As a result, it is possible to move a position of an exit pupil away from the image plane and to make a peripheral light flux incident on a light receiving surface of an imaging element at an angle close to a right angle.

In addition, the first lens group G1 is preferably "fixed to the image plane" at the time of the focusing. In this way, it is possible to simplify a moving mechanism for the focusing, and all of the imaging lenses including the mechanism can easily be downsized.

In regard to the imaging lenses, all the lenses constituting the first, second, and third lens groups G1, G2, and G3 can be "spherical lenses". Although some of the imaging lenses can be lenses having aspherical surfaces or diffraction surfaces, these lenses are not adopted. In this way, cost for a shaping mold and the like can be avoided, for example, which is particularly advantageous in terms of the cost during production in small lots.

In terms of the lens material, a material of all the lenses constituting the first lens group G1, the second lens group G2, and the third lens group G3 is preferably an inorganic solid material.

The lens that is formed of an organic material, an organic-inorganic hybrid material, or the like exhibits a significant characteristic change under environmental conditions such as temperature and humidity. When all the lenses constituting the imaging lenses are formed of the inorganic solid material, the imaging lenses, each of which is less susceptible to changes in the environmental conditions, such as the temperature and the humidity, can be formed.

By using the imaging lenses according to this disclosure, it is possible to provide the high-performance imaging device capable of making the favorable aberration correction from infinity to the short length without the deterioration of the performance at the time of the focusing.

Before providing the specific embodiments of the "imaging lens", a description will be made on an embodiment of the product inspection apparatus that uses the imaging device using the imaging lenses according to this disclosure with reference to FIGS. 21A and 21B.

The product inspection apparatus, which will be described below, is an apparatus for performing "product inspection".

There can be various types of the inspection and inspection items for the product inspection. However, for the sake of simplicity, a description will be made on an example of inspecting "presence or absence of a scratch" on a product manufactured in the large number.

Figure 21A:
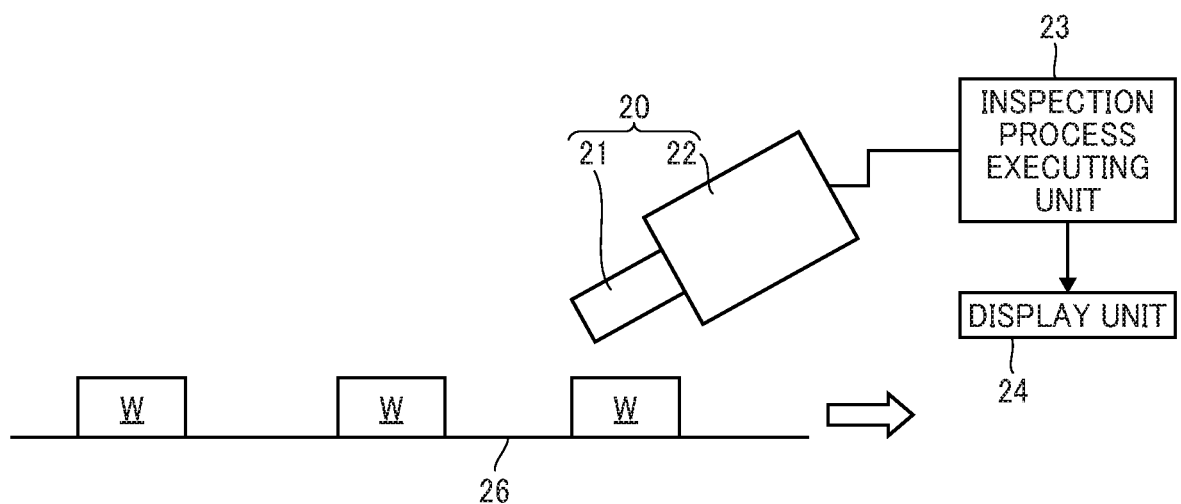
FIGS. 21A and 21B are illustrations of an example of an imaging device.

In FIG. 21A, an image device 20, an inspection process executing unit 23, a display unit 24, a product W, and a product conveying belt 26 (hereinafter simply referred to as a conveying belt 26).

The imaging device 20 is a camera function unit in the product inspection apparatus, and includes a photographing optical system (an imaging lens 21) and an image processing unit 22.

Products W as inspection targets are placed at equally-spaced intervals on the conveying belt 26, and is transported by the conveying belt 26 at a constant speed in an arrow direction (rightward in the drawing).

The photographing optical system forms an image of the product W as the inspection target. The imaging lens according to any one of claims 1 to 15, more specifically, the imaging lens according to any of the first to fifth embodiments, which will be described later, can be used in the photographing optical system. Thus, the photographing optical system is hereinafter referred to as an imaging lens 21.

Figure 21B:
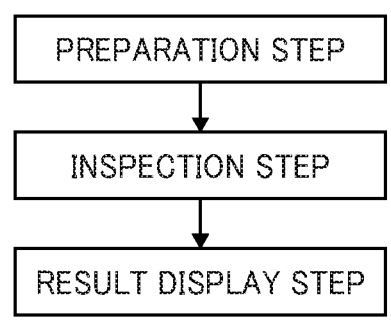

The process of the product inspection includes "preparation step", an "inspection step", and a "result display step" illustrated in FIG. 21B. Of these steps, the "inspection step and the result display step" correspond to an "inspection process".

In the "preparation step", inspection conditions are set.

More Specifically, a photographing position and a photographing angle of the imaging lens 21 (an orientation of the imaging lens and a distance from a photographing target, that is, an object distance) are defined according to the size and shape of the product W conveyed by the conveying belt 26 and a portion to be inspected for the presence or the absence of the scratch. The object distance is a so-called working distance.

Then, the imaging lens 21 is focused according to a position and size of the scratch, the presence or the absence of which is to be detected. Since the imaging lens according to each of the first to fifth embodiments has a focusing function, the imaging lens can be focused according to the appropriately set object distance on the basis of the inspection item (the presence or the absence of the scratch in the example). In the example, focusing can be performed according to the appropriately set object distance according to the presence or absence of a scratch.

Meanwhile, a model product determined not to have the scratch is placed at an inspection position on the conveying belt 26, and is photographed by the imaging lens 21.

The "area sensor (a solid imaging element)" arranged in the image processing unit 22 photographs the model product. Then, an image captured by the area sensor is converted to "image information", and is subjected to image processing to create digital data.

The digital data subjected to the image processing is sent to the inspection process executing unit 23, and the inspection process executing unit 23 stores the digital data as model data.

In the inspection step, the products W are placed at the same angle as the model product on the conveying belt 26, and are sequentially conveyed by the conveying belt 26. Each of the conveyed products W is photographed by the imaging lens 21 as passing the inspection position. Then, the image of each of the conveyed products W is converted to the digital data by the image processing unit 22 and is sent to the inspection process executing unit 23.

The inspection process executing unit 23 is configured as a computer or a central processing unit (CPU), controls the image processing unit 22, and also controls the photographing and the focusing of the imaging lens 21 via the image processing unit 22.

When receiving the image data of the product W digitized by the image processing unit 22, the inspection process executing unit 23 performs matching between this image data and the stored model data.

In the case where the photographed product W has the scratch, the image data does not match the model data. Thus, in this case, such a product is determined as a defective product.

On the other hand, in the case where the product W has no scratch, the image data of such a product matches the model data. Thus, in this case, such a product is determined as a non-defective product.

The result display step is a step of displaying a determination result of each of the products W as the non-defective product or the defective product by the inspection process executing unit 23 on the display unit 24.

In terms of the configuration of the apparatus, the inspection process executing unit 23 and the display unit 24 constitute an inspection process executing device.

Numerical Examples of Imaging Lens

The description will hereinafter be made on five specific embodiments of the imaging lens according to this disclosure.

Meanings of symbols in the embodiments and corresponding aberration views are as follows.

F: F number
Y': Image height
R: Radius of curvature
D: Distance between planes
$N_d$: Refractive index with respect to d line
$v_d$: Abbe number with respect to d line
BF: Back focus
$\theta_{g,F}$: Partial dispersion ratio Unless otherwise noted, a unit of quantity with a length dimension is "mm".

First Embodiment

The first embodiment corresponds to the imaging lens, the lens configuration of which is described above with reference to FIG. 1.

Focal length f: 8.01 F number: 2.06 Half angle of view ω: 35.0°

Data of the imaging lens in the first embodiment is listed in Table 1.

TABLE 1

| | R | D | $N_d$ | $v_d$ | $\theta_{g,F}$ | Note |
|---|---|---|---|---|---|---|
| 1 | 20.090 | 1.18 | 2.00100 | 29.12 | | First lens |
| 2 | 10.234 | 3.68 | | | | |
| 3 | −191.294 | 1.91 | 2.00069 | 25.46 | | Second lens |
| 4 | −32.805 | A | | | | |
| 5 | 75.064 | 0.85 | 1.85026 | 32.35 | | Third lens |
| 6 | 8.977 | 1.15 | | | | |
| 7 | −147.655 | 2.28 | 1.84666 | 23.78 | | Fourth lens |
| 8 | −16.607 | 0.48 | | | | |
| 9 | −12.169 | 4.52 | 1.65160 | 58.62 | | Fifth lens |
| 10 | −30.895 | 0.10 | | | | |
| 11 | 35.092 | 4.20 | 1.64000 | 60.19 | | Sixth lens |
| 12 | −13.717 | 2.08 | | | | |
| 13 | 0.000 | 3.82 | | | | |
| 14 | 0.000 | 1.9 | | | | |
| 15 | 0.000 | 1.48 | | | | |
| 16 | −7.571 | 0.70 | 1.54072 | 46.97 | | Seventh lens |
| 17 | 12.373 | 2.85 | 1.59282 | 68.62 | 0.5441 | Eighth lens |
| 18 | −10.098 | 1.03 | | | | |
| 19 | 72.582 | 0.76 | 2.00069 | 25.46 | | Ninth lens |
| 20 | 16.320 | 0.62 | | | | |
| 21 | 64.742 | 2.38 | 1.61800 | 63.34 | | Tenth lens |
| 22 | −17.872 | 0.10 | | | | |
| 23 | 16.183 | 2.86 | 1.59282 | 68.62 | | Eleventh lens |
| 24 | −50.980 | B | | | | |
| 25 | 0.000 | 0.75 | 1.51633 | 64.14 | | Filter or the |

TABLE 1-continued

| | R | D | $N_d$ | $v_d$ | $\theta_{g,F}$ | Note |
|---|---|---|---|---|---|---|
| | | | | | | like |
| 26 | 0.000 | BF | | | | |

"A" in the column of distance between planes: D is a distance between the first lens group G1 and the second lens group G2, and "B" is a distance between the third lens group G3 and the filter or the like F. Each of "A" and "B" is a variable distance that varies during the focusing, and the same applies to the second and subsequent embodiments, which will be described later.

The variable distances are listed in Table 2.

TABLE 2

| | Infinity | ×0.03 | ×0.07 |
|---|---|---|---|
| A | 1.700 | 1.459 | 1.134 |
| B | 11.502 | 11.744 | 12.068 |

The values of "×0.03" and "×0.07" in the top row of Table 2 refer to imaging magnifications of the imaging lens are listed, and the same applies to the following embodiments.

Parameter Values in Conditional Expressions

Values of the parameters in the conditional expressions are listed in Table 3.

TABLE 3

| | |
|---|---|
| $d_{L22a-L23b}/L_{2g}$ | 0.47 |
| $f_{2g3g}/f$ | 1.30 |
| $f_{L21}/f_{L24}$ | −0.76 |
| $(R_{L21b} + R_{L24b})/(R_{L21b} − R_{L24b})$ | −0.21 |
| $f_{L22}/f_{L23}$ | −0.64 |
| $f_{2g}/f_{L22L23}$ | 0.32 |
| $L_{3g}/L_2$ | 0.78 |
| $f_{2g}/f_{3g}$ | 1.35 |
| $(R_{L31a} − R_{L32b})/(R_{L31a} + R_{L32b})$ | −0.14 |
| nd | 1.59282 |
| vd | 68.62 |
| $\theta_{g,F}$ | 0.5441 |
| $\theta_{g,F} − (−0.001802 × vd + 0.6483)$ | 0.019 |

Second Embodiment

The second embodiment corresponds to the imaging lens, the lens configuration of which is described above with reference to FIG. 2.

Focal length f: 8.01 F number: 2.06 Half angle of view ω: 35.0°

Data in the second embodiment is listed in Table 4.

TABLE 4

| | R | D | $N_d$ | $v_d$ | $\theta_{g,F}$ | Note |
|---|---|---|---|---|---|---|
| 1 | 18.925 | 1.21 | 2.00100 | 29.12 | | First lens |
| 2 | 10.146 | 3.61 | | | | |
| 3 | −619.215 | 1.90 | 2.00069 | 25.46 | | Sceond lens |
| 4 | −37.213 | A | | | | |
| 5 | 62.585 | 0.86 | 2.00100 | 29.12 | | Third lens |
| 6 | 9.148 | 1.90 | | | | |
| 7 | 1776.272 | 2.54 | 1.92119 | 23.96 | | Fourth lens |
| 8 | −16.285 | 0.38 | | | | |
| 9 | −12.725 | 6.62 | 1.77250 | 49.62 | | Filth lens |
| 10 | −33.582 | 0.10 | | | | |
| 11 | 43.883 | 3.43 | 1.65160 | 58.62 | | Sixth lens |
| 12 | −14.039 | 2.21 | | | | |
| 13 | 0.000 | 3.82 | | | | |
| 14 | 0.000 | 1.7 | | | | |
| 15 | 0.000 | 2.12 | | | | |

TABLE 4-continued

| | R | D | $N_d$ | $v_d$ | $\theta_{g,F}$ | Note |
|---|---|---|---|---|---|---|
| 16 | −7.411 | 0.70 | 1.54072 | 46.97 | | Seventh lens |
| 17 | 14.530 | 2.88 | 1.59282 | 68.62 | 0.5441 | Eighth lens |
| 18 | −9.692 | 0.91 | | | | |
| 19 | 64.205 | 0.77 | 2.00069 | 25.46 | | Ninth lens |
| 20 | 16.206 | 0.63 | | | | |
| 21 | 62.998 | 2.42 | 1.59282 | 68.62 | | Tenth lens |
| 22 | −18.027 | 0.10 | | | | |
| 23 | 16.032 | 2.79 | 1.59282 | 68.62 | | Eleventh lens |
| 24 | −62.808 | B | | | | |
| 25 | 0.000 | 0.75 | 1.51633 | 64.14 | | Filter or the like |
| 26 | 0.000 | BF | | | | |

The variable distances are listed in Table 5.

TABLE 5

| | Infinity | ×0.03 | ×0.07 |
|---|---|---|---|
| A | 1.770 | 1.530 | 1.207 |
| B | 11.612 | 11.852 | 12.175 |

Parameter Values in Conditional Expressions

The values of the parameters in the conditional expressions are listed in Table 6.

TABLE 6

| | |
|---|---|
| $d_{L22a-L23b}/L_{2g}$ | 0.58 |
| $f_{2g3g}/f$ | 1.26 |
| $f_{L21}/f_{L24}$ | −0.65 |
| $(R_{L21b} + R_{L24b})/(R_{L21b} − R_{L24b})$ | −0.21 |
| $f_{L22}/f_{L23}$ | −0.57 |
| $f_{2g}/f_{L22L23}$ | 0.44 |
| $L_{3g}/L_2$ | 0.71 |
| $f_{2g}/f_{3g}$ | 1.25 |
| $(R_{L31a} − R_{L32b})/(R_{L31a} + R_{L32b})$ | −0.13 |
| nd | 1.59282 |
| vd | 68.62 |
| $\theta_{g,F}$ | 0.5441 |
| $\theta_{g,F} − (−0.001802 \times vd + 0.6483)$ | 0.019 |

Third Embodiment

The third embodiment corresponds to the imaging lens, the lens configuration of which is described above with reference to FIG. 3.

Focal length f: 8.01 F number: 2.06 Half angle of view ω: 35.0°

Data in the third embodiment is listed in Table 7.

TABLE 7

| | R | D | $N_d$ | $v_d$ | $\theta_{g,F}$ | Note |
|---|---|---|---|---|---|---|
| 1 | 18.1600 | 1.22 | 1.95375 | 32.32 | | First lens |
| 2 | 9.524 | 3.56 | | | | |
| 3 | 216.840 | 1.66 | 2.00069 | 25.46 | | Second lens |
| 4 | −50.458 | A | | | | |
| 5 | 1369.611 | 0.88 | 1.95000 | 29.37 | | Third lens |
| 6 | 10.419 | 1.74 | | | | |
| 7 | 1016.868 | 2.28 | 2.00069 | 25.46 | | Fourth lens |
| 8 | −16.211 | 7.50 | 1.80400 | 46.53 | | Fifth lens |
| 9 | −57.308 | 0.10 | | | | |
| 10 | 41.962 | 3.84 | 1.64000 | 60.19 | | Sixth lens |
| 11 | −13.560 | 2.79 | | | | |
| 12 | 0.000 | 2.91 | | | | |
| 13 | 0.000 | 1.96 | | | | Aperture |
| 14 | 0.000 | 1.38 | | | | |
| 15 | −8.209 | 2.44 | 1.53172 | 48.84 | | Seventh lens |
| 16 | 10.028 | 4.27 | 1.59319 | 67.86 | 0.5440 | Eighth lens |
| 17 | −12.791 | 0.10 | | | | |
| 18 | 40.928 | 0.73 | 2.00069 | 25.46 | | Ninth lens |
| 19 | 15.434 | 0.71 | | | | |
| 20 | 55.783 | 2.31 | 1.59319 | 67.90 | | Tenth lens |
| 21 | −20.145 | 0.10 | | | | |
| 22 | 16.444 | 3.09 | 1.59319 | 67.90 | | Eleventh lens |
| 23 | −69.060 | B | | | | |
| 24 | 0.000 | 0.75 | 1.51633 | 64.14 | | Filter or the like |
| 25 | 0.000 | BF | | | | |

The variable distances are listed in Table 8.

TABLE 8

| | Infinity | ×0.03 | ×0.07 |
|---|---|---|---|
| A | 2.119 | 1.876 | 1.550 |
| B | 11.505 | 11.748 | 12.074 |

Parameter Values in Conditional Expressions

The values of the parameters in the conditional expressions are listed in Table 9.

TABLE 9

| | |
|---|---|
| $d_{L22a-L23b}/L_{2g}$ | 0.60 |
| $f_{2g3g}/f$ | 1.32 |
| $f_{L21}/f_{L24}$ | −0.67 |
| $(R_{L21b} + R_{L24b})/(R_{L21b} − R_{L24b})$ | −0.13 |
| $f_{L22}/f_{L23}$ | −0.52 |
| $f_{2g}/f_{L22L23}$ | 0.54 |
| $L_{3g}/L_2$ | 0.84 |
| $f_{2g}/f_{3g}$ | 1.26 |
| $(R_{L31a} − R_{L32b})/(R_{L31a} + R_{L32b})$ | −0.22 |
| nd | 1.59319 |
| vd | 67.86 |
| $\theta_{g,F}$ | 0.5440 |
| $\theta_{g,F} − (−0.001802 \times vd + 0.6483)$ | 0.018 |

Fourth Embodiment

The fourth embodiment corresponds to the imaging lens, the lens configuration of which is described above with reference to FIG. 4.

Focal length f: 8.01 F number: 2.06 Half angle of view ω: 35.0°

Data in the fourth embodiment is listed in Table 10.

TABLE 10

| | R | D | $N_d$ | $v_d$ | $\theta_{g,F}$ | Note |
|---|---|---|---|---|---|---|
| 1 | 18.157 | 0.73 | 1.95000 | 29.37 | | First lens |
| 2 | 9.576 | 3.97 | | | | |
| 3 | −226.633 | 2.82 | 2.00069 | 25.46 | | Second lens |
| 4 | −36.960 | A | | | | |
| 5 | 733.452 | 0.70 | 1.80400 | 46.53 | | Third lens |
| 6 | 9.923 | 2.66 | | | | |
| 7 | 827.747 | 7.50 | 2.00069 | 25.46 | | Fourth lens |
| 8 | −7.398 | 4.97 | 1.84666 | 23.78 | | Fifth lens |
| 9 | −118.569 | 0.10 | | | | |
| 10 | 14.777 | 2.73 | 1.51633 | 64.14 | | Sixth lens |
| 11 | −22.375 | 1.49 | | | | |
| 12 | 0.000 | 3.12 | | | | |
| 13 | 0.000 | 2.02 | | | | Aperture |
| 14 | 0.000 | 1.51 | | | | |
| 15 | −7.247 | 2.76 | 1.51742 | 52.43 | | Seventh lens |
| 16 | 31.705 | 2.42 | 1.61800 | 63.33 | 0.5441 | Eighth lens |
| 17 | −11.024 | 0.10 | | | | |
| 18 | 120.757 | 0.70 | 2.00069 | 25.46 | | Ninth lens |
| 19 | 11.681 | 2.72 | 1.49700 | 81.54 | | Tenth lens |
| 20 | −18.537 | 0.10 | | | | |

TABLE 10-continued

| | R | D | $N_d$ | $v_d$ | $\theta_{g,F}$ | Note |
|---|---|---|---|---|---|---|
| 21 | 21.757 | 1.74 | 1.95375 | 32.33 | | Eleventh lens |
| 22 | −418.039 | B | | | | |
| 23 | 0.000 | 0.75 | 1.51633 | 64.14 | | Filter or the like |
| 24 | 0.000 | BF | | | | |

The variable distances are listed in Table 11.

TABLE 11

| | Infinity | ×0.03 | ×0.07 |
|---|---|---|---|
| A | 2.216 | 1.975 | 1.650 |
| B | 11.505 | 11.747 | 12.071 |

Parameter Values in Conditional Expressions
The values of the parameters in the conditional expressions are listed in Table 12.

TABLE 12

| | |
|---|---|
| $d_{L22a-L23b}/L_{2g}$ | 0.67 |
| $f_{2g3g}/f$ | 1.36 |
| $f_{L21}/f_{L24}$ | −0.71 |
| $(R_{L21b} + R_{L24b})/(R_{L21b} - R_{L24b})$ | −0.39 |
| $f_{L22}/f_{L23}$ | −0.77 |
| $f_{2g}/f_{L22L23}$ | 0.49 |
| $L_{3g}/L_2$ | 0.56 |
| $f_{2g}/f_{3g}$ | 0.91 |
| $(R_{L31a} - R_{L32b})/(R_{L31a} + R_{L32b})$ | −0.21 |
| nd | 1.61800 |
| vd | 63.33 |
| $\theta_{g,F}$ | 0.5441 |
| $\theta_{g,F} - (-0.001802 \times vd + 0.6483)$ | 0.010 |

Fifth Embodiment

The fifth embodiment corresponds to the imaging lens, the lens configuration of which is described above with reference to FIG. 5.

Focal length f: 8.01 F number: 2.06 Half angle of view ω: 35.0°

Data in the fifth embodiment is listed in Table 13.

TABLE 13

| | R | D | $N_d$ | $v_d$ | $\theta_{g,F}$ | Note |
|---|---|---|---|---|---|---|
| 1 | 18.292 | 1.20 | 2.00100 | 29.13 | | First lens |
| 2 | 9.677 | 3.92 | | | | |
| 3 | −77.612 | 1.63 | 2.00069 | 25.46 | | Second lens |
| 4 | −27.773 | A | | | | |
| 5 | −58.514 | 0.87 | 1.76200 | 40.10 | | Third lens |
| 6 | 9.477 | 1.83 | | | | |
| 7 | 459.438 | 1.90 | 2.00069 | 25.46 | | Fourth lens |
| 8 | −20.430 | 0.52 | | | | |
| 9 | −13.664 | 5.07 | 1.61800 | 63.33 | | Fifth lens |
| 10 | −25.106 | 0.10 | | | | |
| 11 | 35.214 | 3.81 | 1.64000 | 60.19 | | Sixth lens |
| 12 | −13.717 | 4.79 | | | | |
| 13 | 0.000 | 0.85 | | | | |
| 14 | 0.000 | 1.45 | | | | |
| 15 | 0.000 | 0.85 | | | | |
| 16 | −9.062 | 0.97 | 1.80101 | 34.97 | | Seventh lens |
| 17 | 12.211 | 3.92 | 1.49700 | 81.54 | 0.5375 | Eighth lens |
| 18 | −10.349 | 0.10 | | | | |
| 19 | 18.511 | 3.43 | 1.59282 | 68.62 | | Ninth lens |
| 20 | −16.430 | 0.10 | | | | |
| 21 | 15.687 | 0.78 | 1.72916 | 54.68 | | Tenth lens |
| 22 | 9.757 | 0.92 | | | | |
| 23 | 18.004 | 2.48 | 1.59319 | 67.90 | | Eleventh lens |
| 24 | −62.648 | B | | | | |

TABLE 13-continued

| | R | D | $N_d$ | $v_d$ | $\theta_{g,F}$ | Note |
|---|---|---|---|---|---|---|
| 25 | 0.000 | 0.75 | 1.51633 | 64.14 | | Filter or the like |
| 26 | 0.000 | BF | | | | |

The variable distances are listed in Table 14.

TABLE 14

| | Infinity | ×0.03 | ×0.07 |
|---|---|---|---|
| A | 2.101 | 1.859 | 1.533 |
| B | 11.506 | 11.747 | 12.073 |

Parameter Values in Conditional Expressions
The values of the parameters in the conditional expressions are listed in Table 15.

TABLE 15

| | |
|---|---|
| $d_{L22a-L23b}/L_{2g}$ | 0.49 |
| $F_{2g3g}/f$ | 1.32 |
| $f_{L21}/f_{L24}$ | −0.67 |
| $(R_{L21b} + R_{L24b})/(R_{L21b} - R_{L24b})$ | −0.18 |
| $f_{L22}/f_{L23}$ | −0.34 |
| $F_{2g}/f_{L22L23}$ | 0.56 |
| $L_{3g}/L_2$ | 0.90 |
| $f_{2g}/f_{3g}$ | 1.06 |
| $(R_{L31a} - R_{L32b})/(R_{L31a} + R_{L32b})$ | −0.07 |
| nd | 1.497 |
| vd | 81.54 |
| $\theta_{g,F}$ | 0.5375 |
| $\theta_{g,F} - (-0.001802 \times vd + 0.6483)$ | 0.036 |

Figure 6:
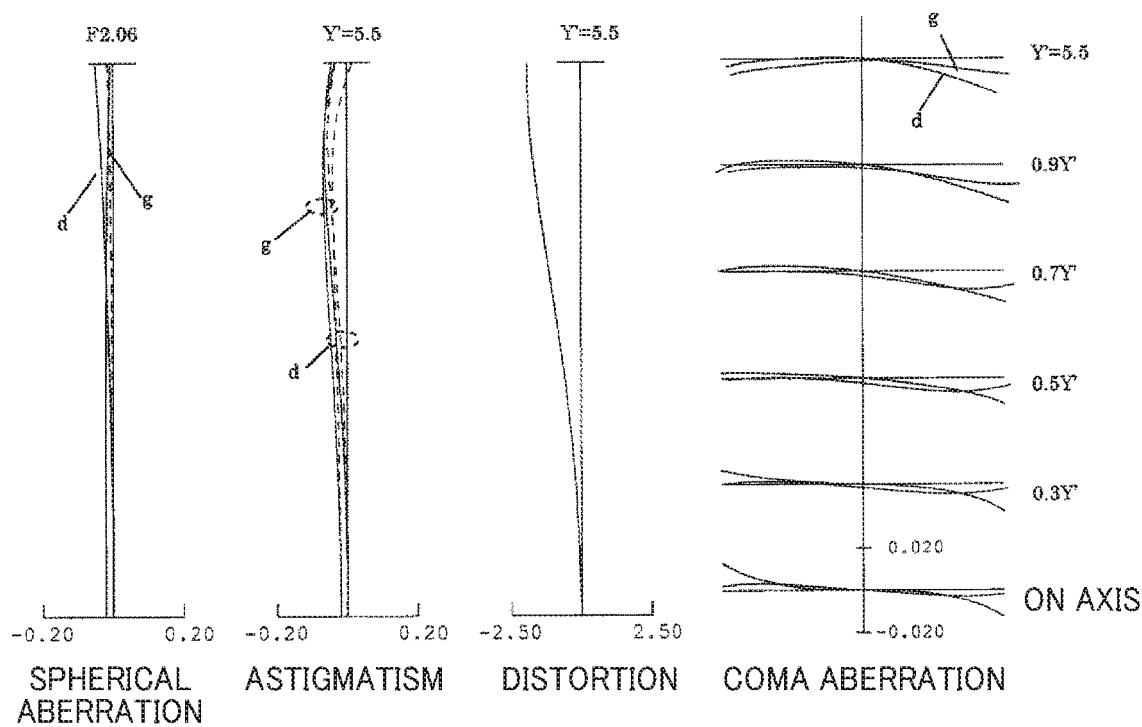
FIG. 6 is a collection of aberration diagrams in a state where the imaging lens according to the first embodiment is focused on an object at infinity.
Figure 7:
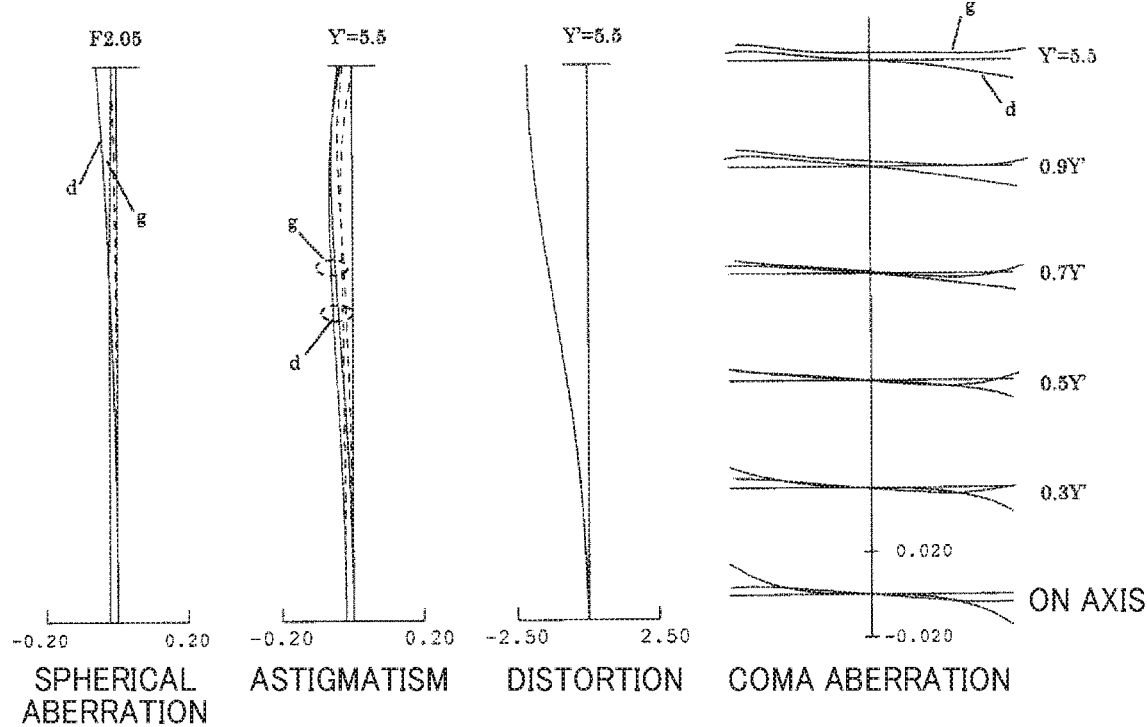
FIG. 7 is a collection of aberration diagrams in a state where the imaging lens according to the first embodiment is focused on an object with a magnification of −0.03.
Figure 8:
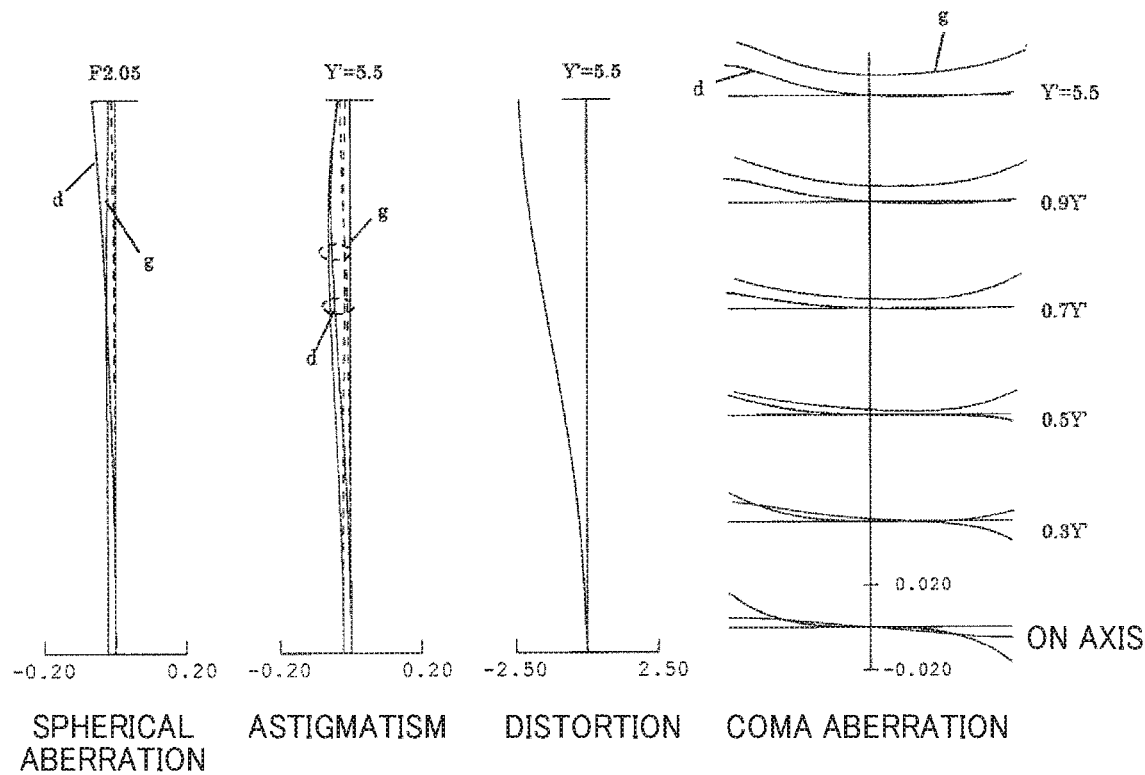
FIG. 8 is a collection of aberration diagrams in a state where the imaging lens according to the first embodiment is focused on an object with a magnification of −0.07.

The aberration views relating to the first embodiment are illustrated in FIG. 6 to FIG. 8.

FIG. 6 includes aberration views in the state where the imaging lenses are focused at infinity. FIG. 7 includes aberration views in a state where the imaging lenses are focused on the object with the magnification: −0.03 (the middle length). FIG. 8 includes aberration views in a state where the imaging lenses are focused on the object with the magnification: −0.07 (the short length).

A broken line in each of views on the spherical aberration represents a sine condition, and a solid line in each of views on the astigmatism represents a sagittal surface, and a broken line therein represents a meridional surface. The same applies to aberration views in the other embodiments.

Figure 9:
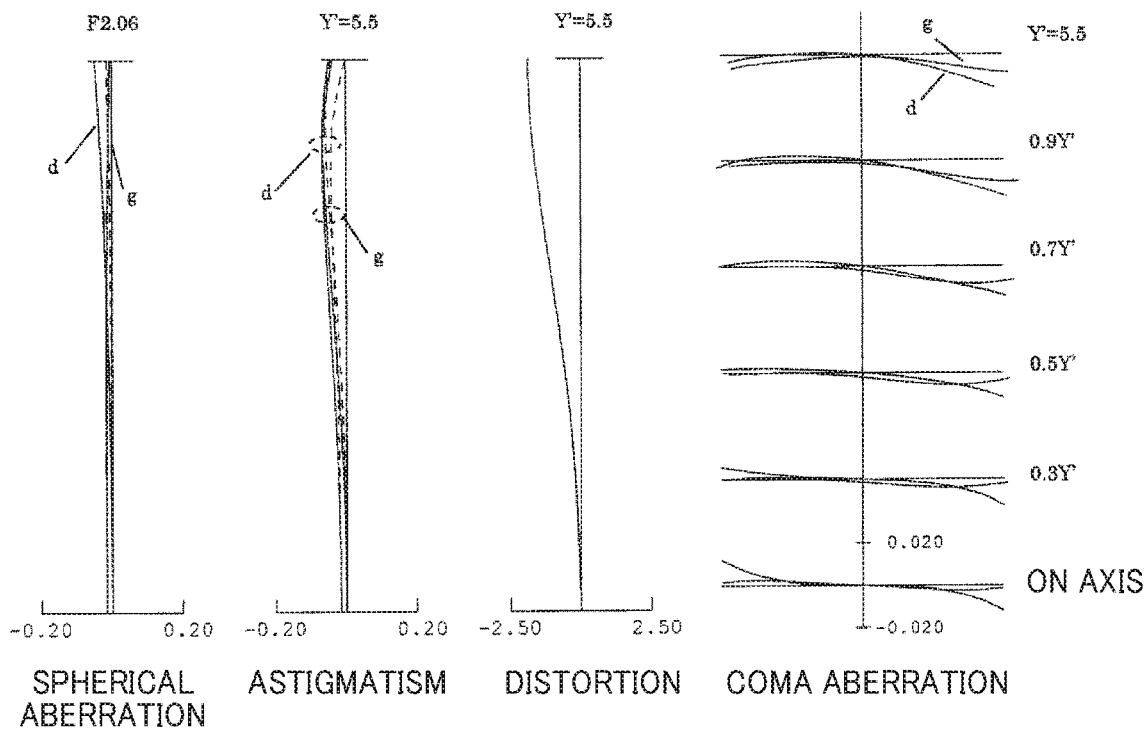
FIG. 9 is a collection of aberration diagrams in a state where the imaging lens according to the second embodiment is focused on the object at infinity.
Figure 10:
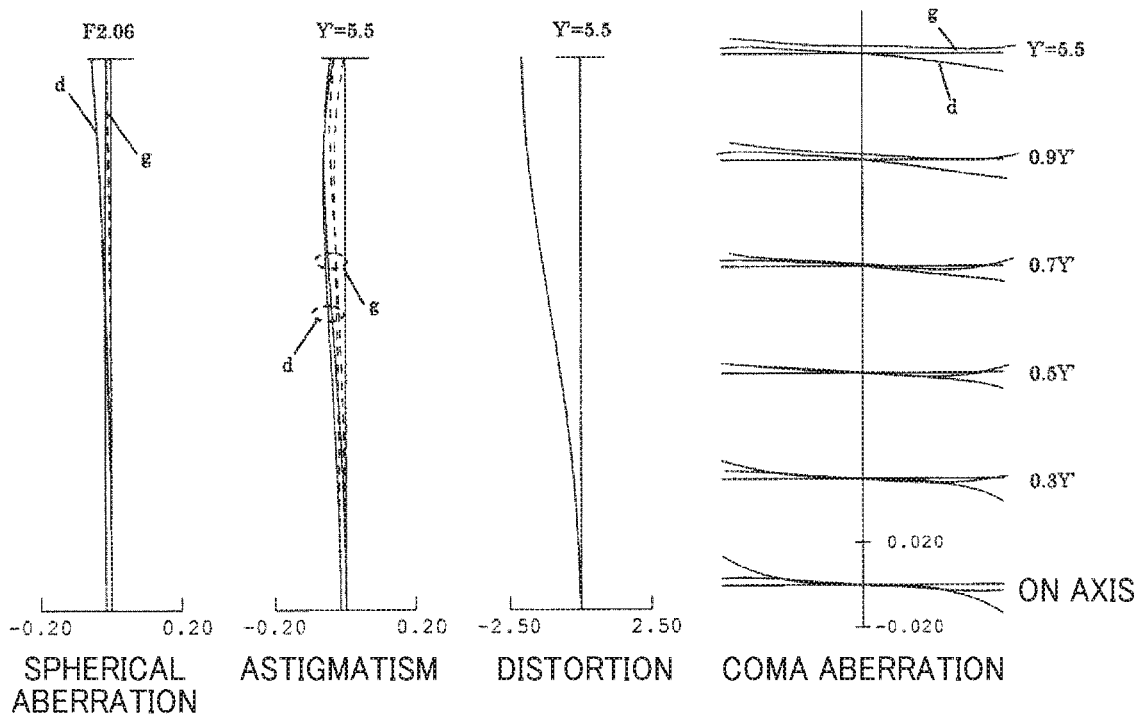
FIG. 10 is a collection of aberration diagrams in a state where the imaging lens according to the second embodiment is focused on the object with the magnification of −0.03.
Figure 11:
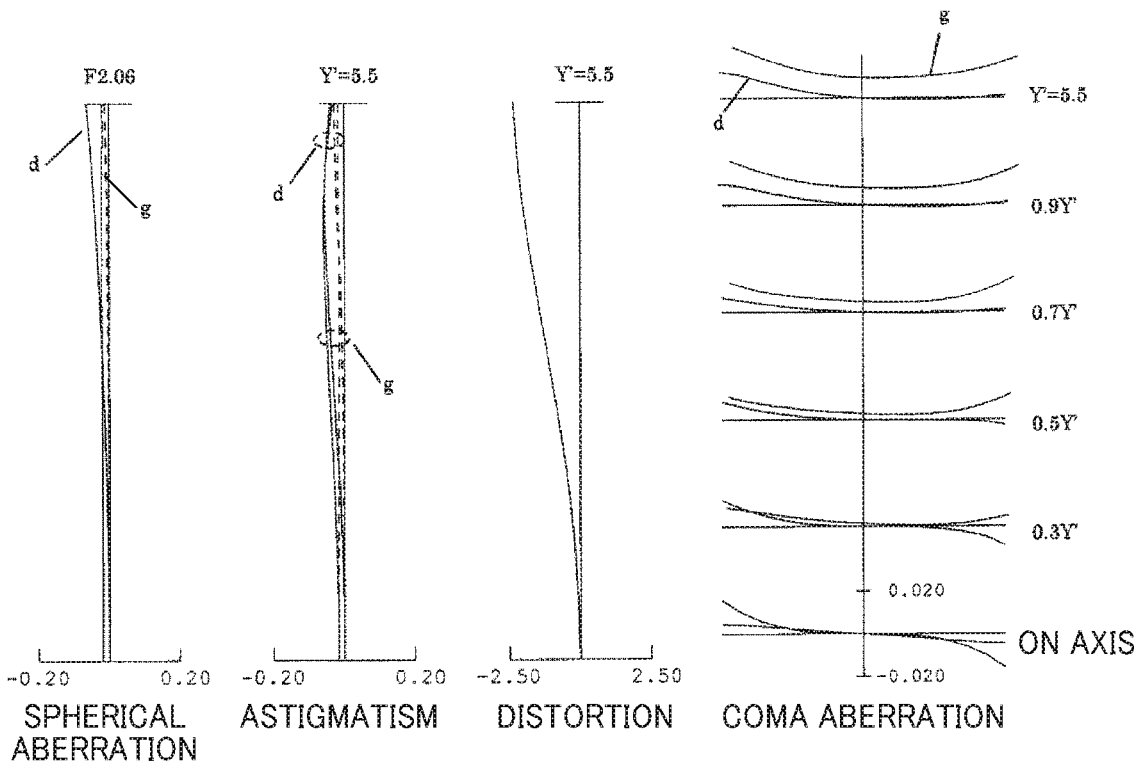
FIG. 11 is a collection of aberration views in a state where the imaging lens according to the second embodiment are focused on the object with the magnification of −0.07.

The aberration views relating to the second embodiment are illustrated in FIG. 9 to FIG. 11. FIG. 9 includes aberration views in the state where the imaging lenses are focused at infinity. FIG. 10 includes aberration views in the state where the imaging lenses are focused on the object with the magnification: −0.03. FIG. 11 includes aberration views in the state where the imaging lenses are focused on the object with the magnification: −0.07.

Figure 12:
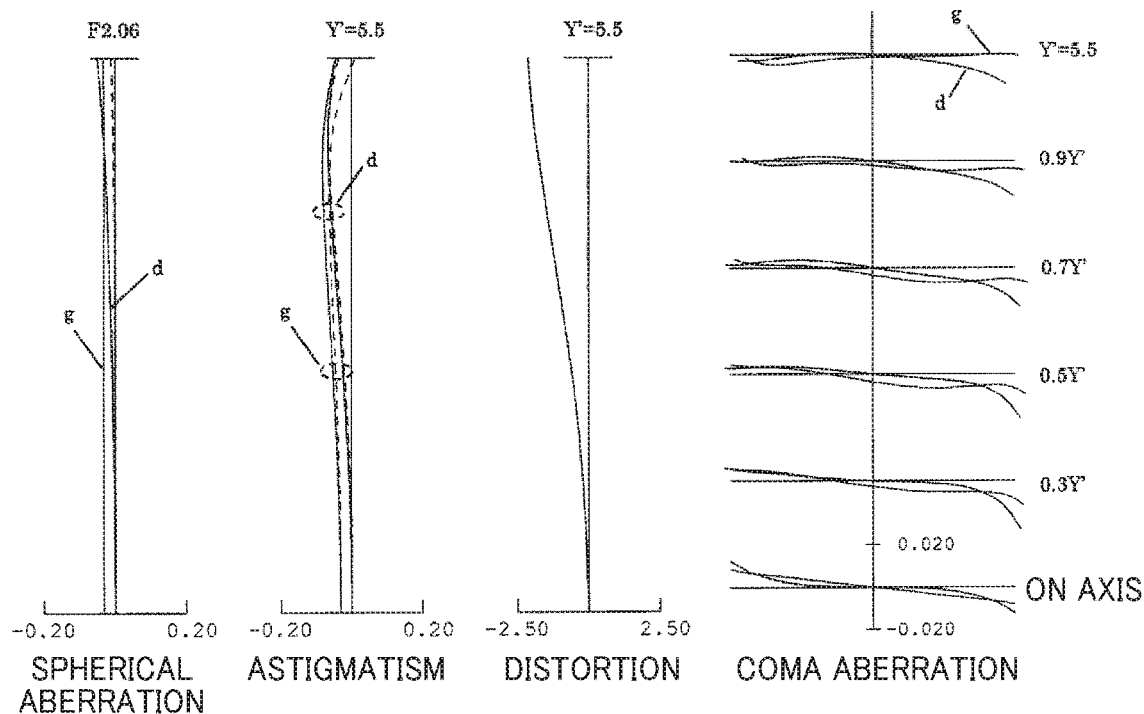
FIG. 12 is a collection of aberration diagrams in a state where the imaging lens according to the third embodiment is focused on the object at infinity.
Figure 13:
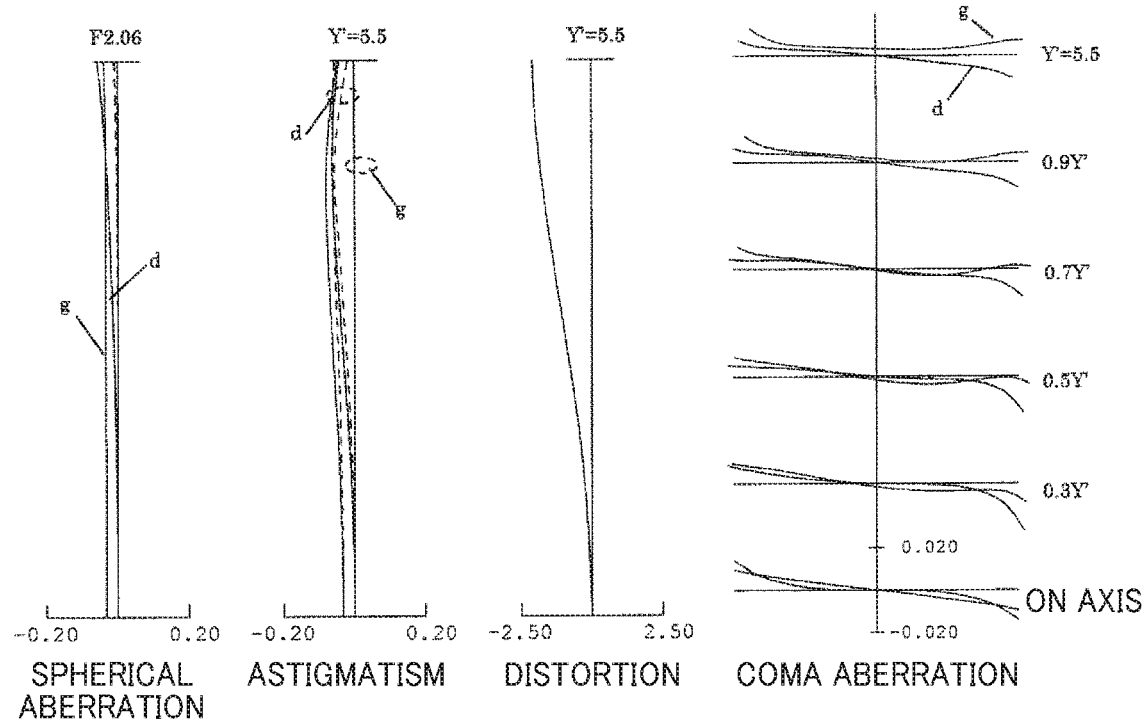
FIG. 13 is a collection of aberration diagrams in a state where the imaging lens according to the third embodiment is focused on the object with the magnification of −0.03.
Figure 14:
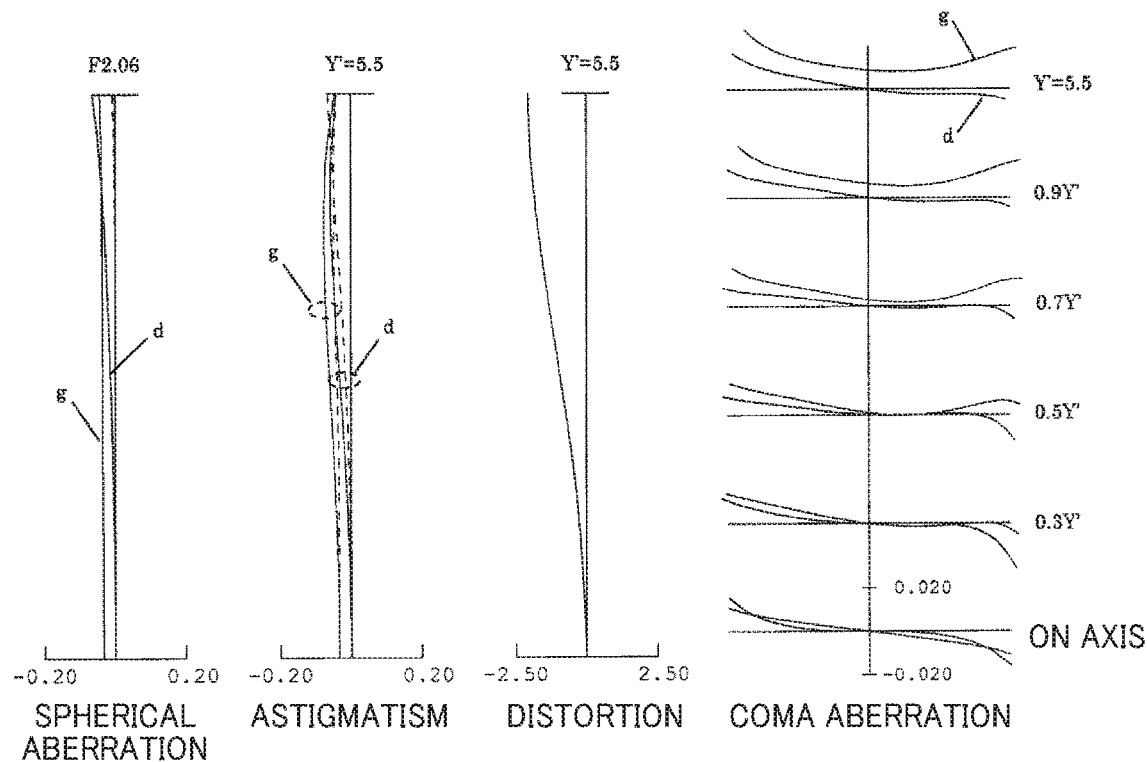
FIG. 14 is a collection of aberration diagrams in a state where the imaging lens in the third embodiment is focused on the object with the magnification of −0.07.

The aberration views relating to the third embodiment are illustrated in FIG. 12 to FIG. 14. FIG. 12 includes aberration views in the state where the imaging lenses are focused at infinity. FIG. 13 includes aberration views in the state where the imaging lenses are focused on the object with the magnification: −0.03. FIG. 14 includes aberration views in the state where the imaging lenses are focused on the object with the magnification: −0.07.

Figure 15:
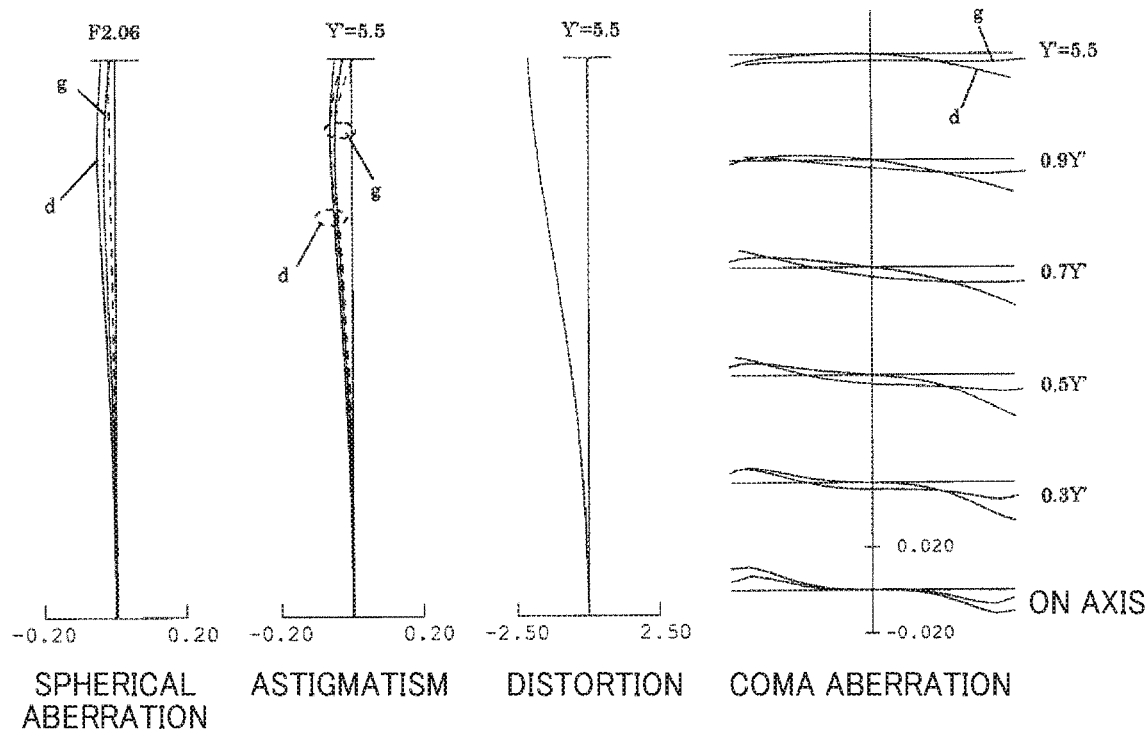
FIG. 15 is a collection of aberration diagrams in a state where the imaging lens according to the fourth embodiment is focused on the object at infinity.
Figure 16:
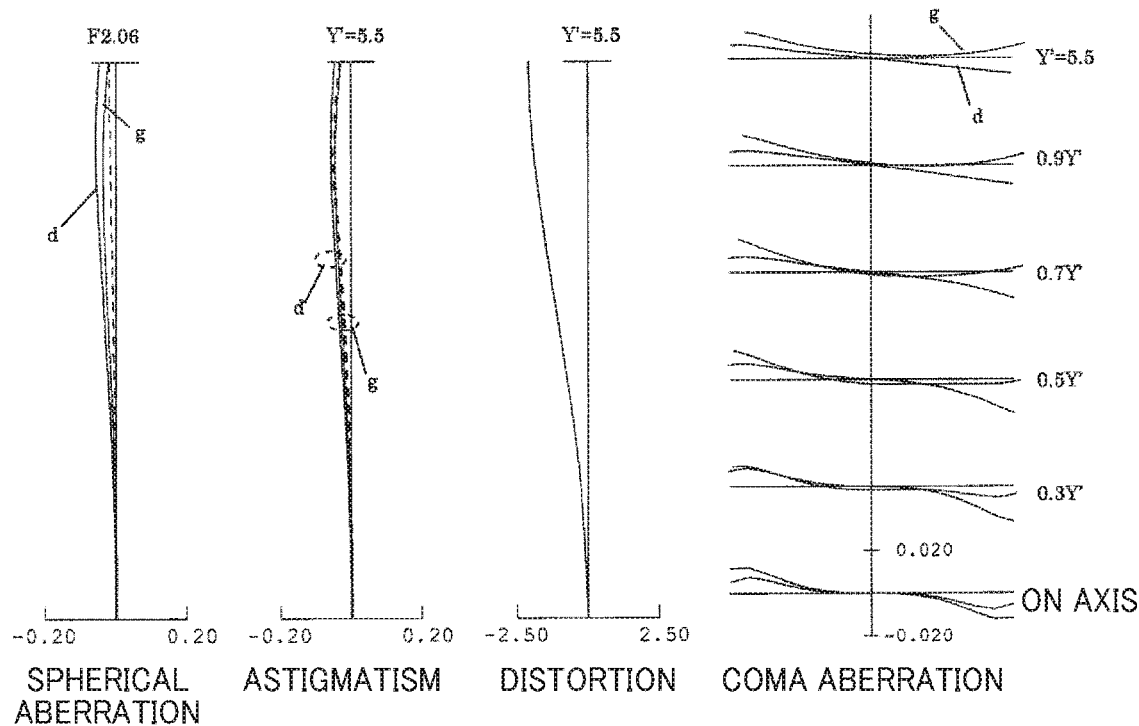
FIG. 16 is a collection of aberration diagrams in a state where the imaging lens according to the fourth embodiment is focused on the object with the magnification of −0.03.
Figure 17:
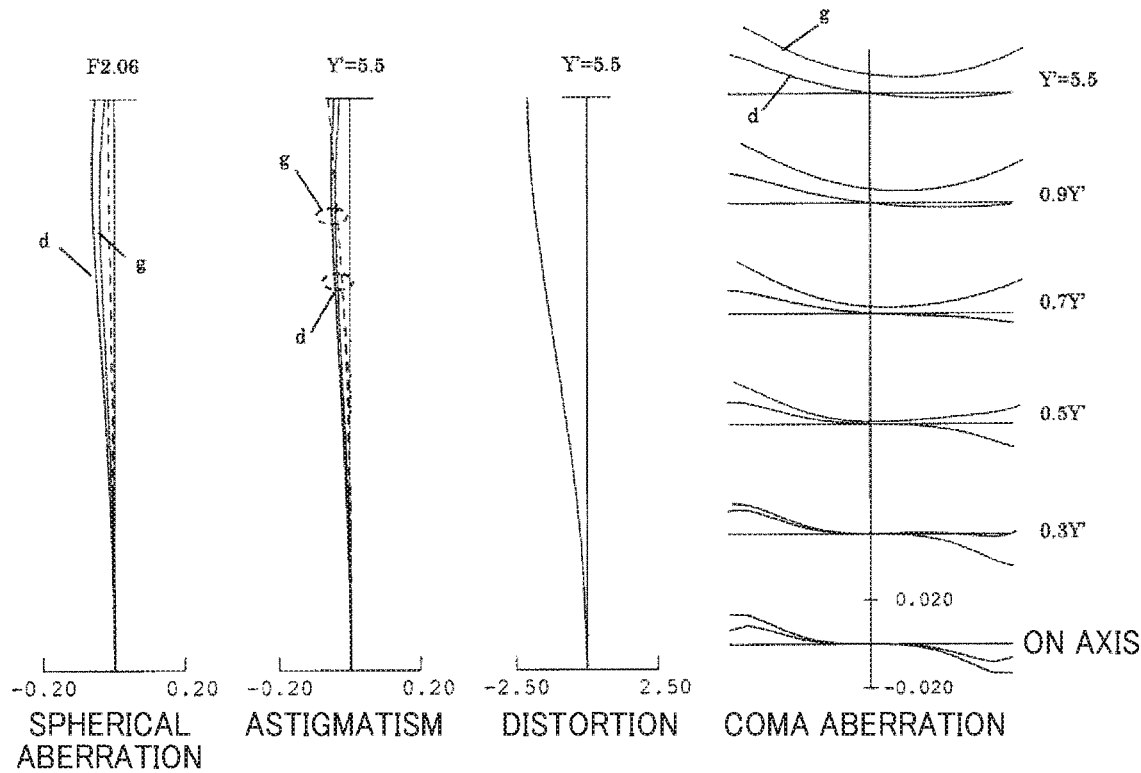
FIG. 17 is a collection of aberration diagrams in a state where the imaging lens according to the fourth embodiment is focused on the object with the magnification of −0.07.

The aberration views relating to the fourth embodiment are illustrated in FIG. 15 to FIG. 17. FIG. 15 includes aberration views in the state where the imaging lenses are focused at infinity. FIG. 16 includes aberration views in the state where the imaging lenses are focused on the object with the magnification: −0.03. FIG. 17 includes aberration views in the state where the imaging lenses are focused on the object with the magnification: −0.07.

Figure 18:
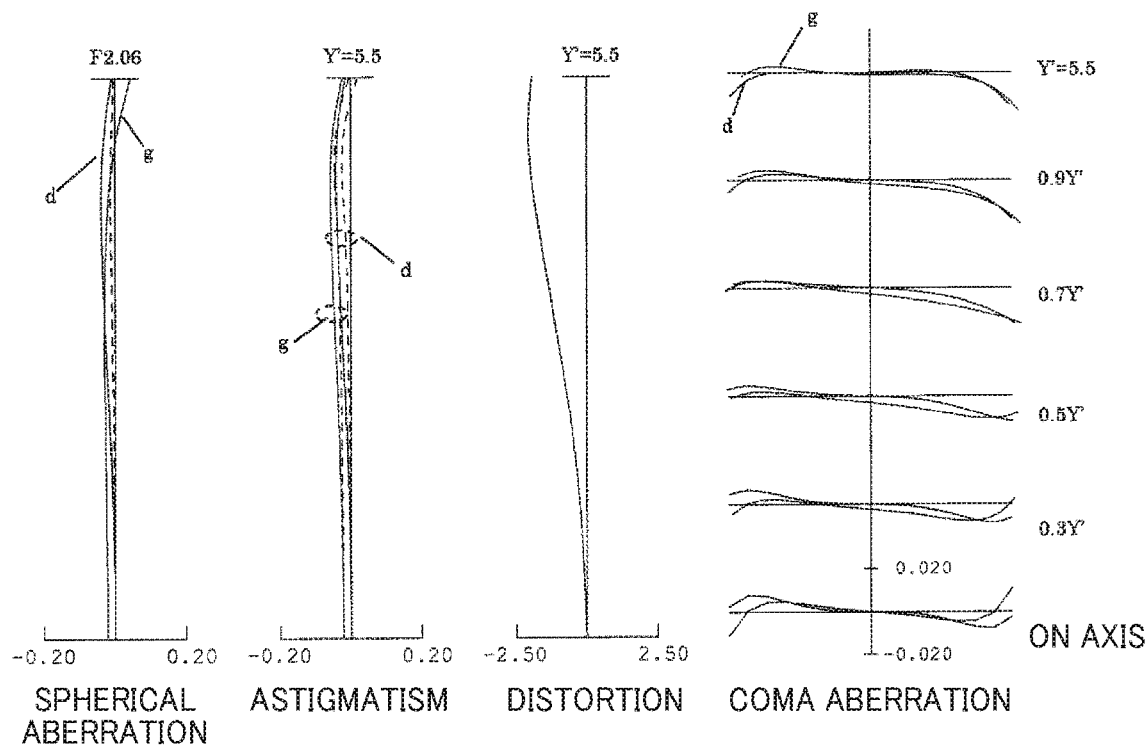
FIG. 18 is a collection of aberration diagrams aberration views in a state where the imaging lens according to the fifth embodiment are focused on the object at infinity.
Figure 19:
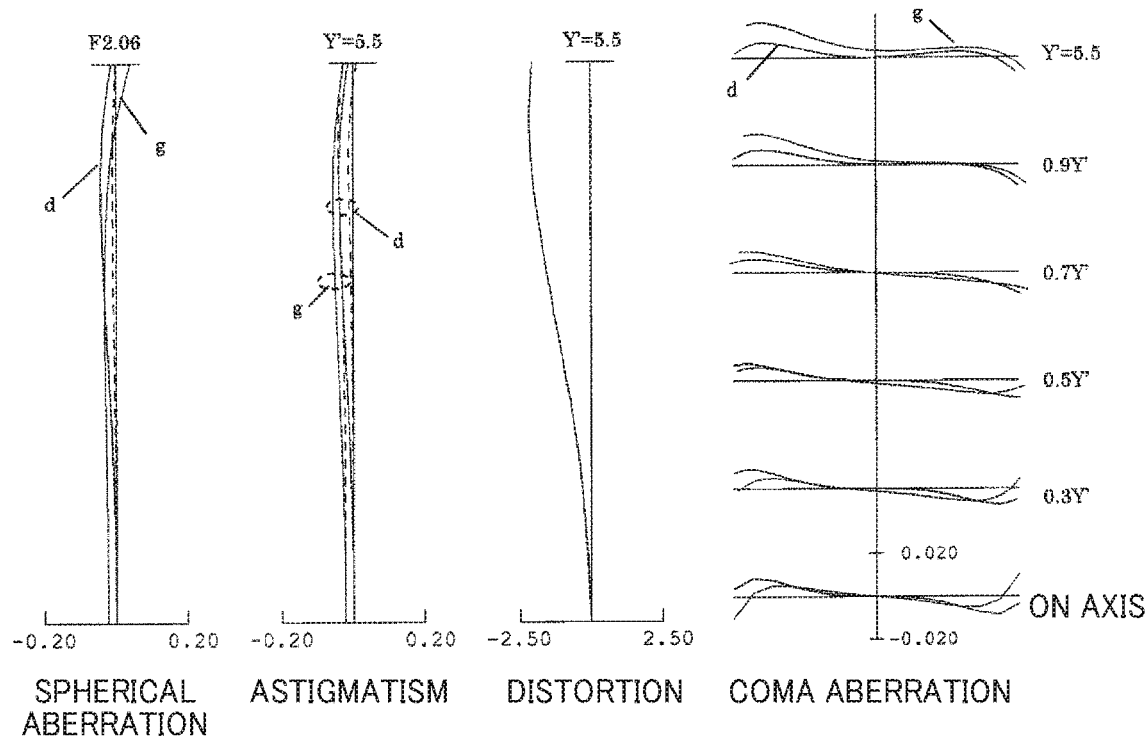
FIG. 19 is a collection of aberration diagrams in a state where the imaging lens according to the fifth embodiment are focused on the object with the magnification of −0.03.
Figure 20:
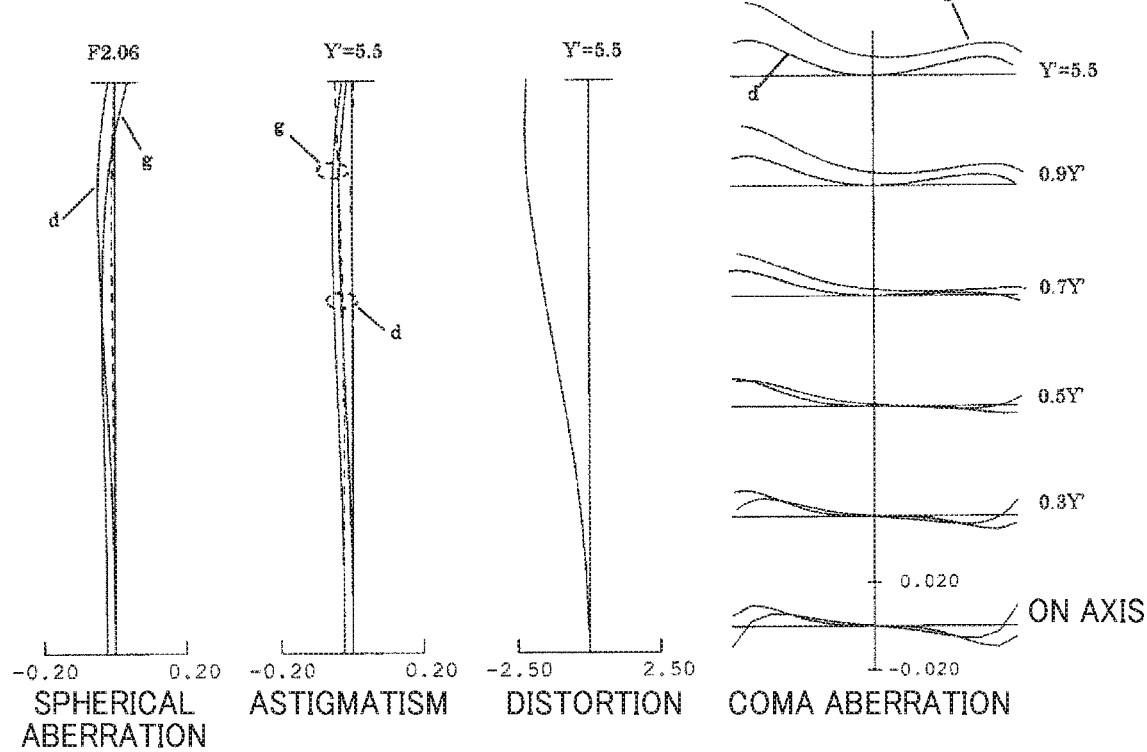
FIG. 20 is a collection of aberration diagrams in a state where the imaging lens according to the fifth embodiment are focused on the object with the magnification of −0.07.

The aberration views relating to the fifth embodiment are illustrated in FIG. 18 to FIG. 20. FIG. 18 includes aberration views in the state where the imaging lenses are focused at infinity. FIG. 19 includes aberration views in the state where the imaging lenses are focused on the object with the magnification: −0.03. FIG. 20 includes aberration views in the state where the imaging lenses are focused on the object with the magnification: −0.07.

Apparent from these aberration views, in each of the embodiments, the various aberrations are corrected at a high level, a change in the spherical aberration associated with the focusing is sufficiently reduced, and changes in the coma aberration and the field curvature are also favorably reduced up to the outermost portion. The axial chromatic aberration and the chromatic aberration of the magnification are also favorably reduced to be small, and distortion is also reduced to about 2.5% as an absolute value from the closest point to infinity.

That is, in each of the imaging lenses according to the first to fifth embodiments, the various aberrations are sufficiently reduced, and is a high-performance imaging lens that has resolving power corresponding up to the "imaging element of about 5 million to 8 million pixels" with the angle of view: about 70°, F number: about 2.0 and that has a small change in the performance associated with the focusing from the object at infinity to the magnification of −0.07.

The preferred embodiments of this disclosure are described so far. However, this disclosure is not limited to the above-described specific embodiments.

Unless otherwise limited by the above description, various modifications and changes can be made within the gist of this disclosure described in the claims.

The effects described in the embodiments of this disclosure are described by merely listing the preferred effects resulting from this disclosure, and the effects by the invention are not limited to those described in the embodiments.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An imaging lens comprising a first lens group, a second lens group having positive refractive power, an aperture and a third lens group having positive refractive power, sequentially disposed in that order from an object side to an image side, wherein during a focusing from infinity to a short length, a combination of the second lens group, the aperture, and the third lens group as a single unit move to the object side so as to reduce a distance to the first lens group, and the second lens group includes four lenses of a second-first negative lens, a second-second positive lens, a second-third negative lens, and a second-fourth positive lens sequentially disposed in that order from the object side to the image side, wherein when $d_{L22a\ L23b}$ denotes a length along an optical axis from an object-side lens plane of the second-second positive lens to an image-side lens plane of the second-third negative lens in the second lens group and $L_{2g}$ denotes a length on the optical axis from an object-side lens plane of the second-first negative lens to an image-side lens plane of the second-fourth positive lens in the second lens group, a conditional expression below is satisfied:

$$0.40 < d_{L22a\ L23b}/L_{2g} < 0.75.$$

2. The imaging lens according to claim 1, wherein when $R_{L21b}$ denotes a radius of curvature of an image-side lens plane of the second-first negative lens and $R_{L24b}$ denotes a radius of curvature of an image-side lens plane of the second-fourth positive lens, a conditional expression below is satisfied:

$$0.50 < (R_{L22b} + R_{L24b})/(R_{L21b} R_{L24b}) < 0.05.$$

3. The imaging lens according to claim 1, wherein when $f_{L22}$ denotes a focal length of the second-second positive lens and $fL23$ denotes a focal length of the second-third negative lens, a conditional expression below is satisfied:

$$0.85 < f_{L22}/f_{L23} < 0.25.$$

4. The imaging lens according to claim 1, wherein when $f_{2g}$ denotes a focal length of the second lens group and $f_{L22L23}$ denotes a composite focal length of the second-second positive lens and the second-third negative lens, a conditional expression below is satisfied:

$$0.20 < f_{2g}/f_{L22L23} < 0.65.$$

5. The imaging lens according to claim 1, wherein when $L_{3g}$ denotes a length along the optical axis from a lens plane closest to the object side to a lens plane closest to the image side in the third lens group and $L_{2g}$ denotes a length along the optical axis from an object-side lens plane of the second-first negative lens to an image-side lens plane of the second-fourth positive lens in the third lens group, a conditional expression below is satisfied:

$$0.40 < L_{3g}/L_{2g} < 1.00.$$

6. The imaging lens according to claim 1, wherein when $f_{2g}$ denotes a focal length of the second lens group and $f_{3g}$ denotes a focal length of the third lens group, a conditional expression below is satisfied:

$$0.60 < f_{2g}/f_{3g} < 1.50.$$

7. The imaging lens according to claim 1, wherein the third lens group has a cemented lens of a third-first negative lens and a third-second positive lens disposed closest to the object side, and when $R_{L31a}$ denotes a radius of curvature of an object-side lens plane of the negative lens $L_{31}$ and $R_{L32b}$ denotes a radius of curvature of an image-side lens plane of the positive lens $L_{32}$, a conditional expression below is satisfied:

$$0.35 < (R_{L31a} R_{L32b})/(R_{L31a} + R_{L32b}) < 0.03.$$

8. The imaging lens according to claim 7, wherein for a material of the third-second positive lens in the third lens group, when nd denotes a refractive index of a d line, νd denotes the Abbe number of the d line, ng, nF, and nC denote refractive indices with respect to a g line, an F line, and a C line, and $\theta_{g,F}$ denotes a partial dispersion ratio of the material defined by $\theta_{g,F}=(ng\,nF)/(nF\,nC)$, conditional expressions below are satisfied:

$$1.45<nd<1.65$$

$$60.0<vd<95.0$$

$$0.009<\theta_{g,F}(0.001802\times vd+0.6483)<0.060.$$

9. The imaging lens according to claim 1, wherein on an image side of a cemented lens of a third-first negative lens and a third-second positive lens, the third lens group includes a third-third negative lens, a third-fourth positive lens, and a third-fifth positive lens disposed in that order from the object side.

10. The imaging lens according to claim 1, wherein the first lens group is a lens group having negative refractive power.

11. The imaging lens according to claim 1, wherein the first lens group is fixed to an image plane at a time of the focusing.

12. The imaging lens according to claim 1, wherein all lenses constituting the first lens group, the second lens group, and the third lens group are spherical lenses.

13. The imaging lens according to claim 1, wherein a material of all lenses constituting the first lens group, the second lens group, and the third lens group is an inorganic solid material.

14. An imaging device comprising the imaging lens according to claim 1.

15. An imaging lens comprising a first lens group, a second lens group having positive refractive power, an aperture and a third lens group having positive refractive power, sequentially disposed in that order from an object side to an image side, wherein
during a focusing from infinity to a short length, a combination of the second lens group, the aperture, and the third lens group as a single unit move to the object side so as to reduce a distance to the first lens group, and
the second lens group includes four lenses of a second-first negative lens, a second-second positive lens, a second-third negative lens, and a second-fourth positive lens sequentially disposed in that order from the object side to the image side,
when f denotes a focal length of an entirety of the imaging lens in a state where the imaging lens is focused on an object at infinity and $f_{2g3g}$ denotes a composite focal length of the second lens group and the third lens group, a conditional expression below is satisfied:

$$1.15<f_{2g3g}/f<1.45.$$

16. An imaging lens comprising a first lens group, a second lens group having positive refractive power, an aperture and a third lens group having positive refractive power, sequentially disposed in that order from an object side to an image side, wherein
during a focusing from infinity to a short length, a combination of the second lens group, the aperture, and the third lens group as a single unit move to the object side so as to reduce a distance to the first lens group, and
the second lens group includes four lenses of a second-first negative lens, a second-second positive lens, a second-third negative lens, and a second-fourth positive lens sequentially disposed in that order from the object side to the image side,
when $f_{L21}$ denotes a focal length of the second-first negative lens and $f_{L24}$ denotes a focal length of the second-fourth positive lens, a conditional expression below is satisfied:

$$0.85<f_{L21}/f_{L24}<0.45.$$

* * * * *